(12) United States Patent
Jegou

(10) Patent No.: US 11,016,218 B2
(45) Date of Patent: May 25, 2021

(54) SCATTER IMAGING

(71) Applicant: SMITHS HEIMANN SAS, Vitry sur Seine (FR)

(72) Inventor: Guillaume Jegou, Vitry sur Seine (FR)

(73) Assignee: SMITHS HEIMANN SAS, Paris (FR)

(*) Notice: Subject to any disclaimer, the term of this patent is extended or adjusted under 35 U.S.C. 154(b) by 87 days.

(21) Appl. No.: 16/321,243

(22) PCT Filed: Jul. 27, 2017

(86) PCT No.: PCT/GB2017/052202
§ 371 (c)(1),
(2) Date: Jan. 28, 2019

(87) PCT Pub. No.: WO2018/020261
PCT Pub. Date: Feb. 1, 2018

(65) Prior Publication Data
US 2019/0179050 A1    Jun. 13, 2019

(30) Foreign Application Priority Data

Jul. 28, 2016  (GB) ...................................... 1613065
Jul. 28, 2016  (GB) ...................................... 1613072

(51) Int. Cl.
| | |
|---|---|
| *G21K 1/00* | (2006.01) |
| *G01V 5/00* | (2006.01) |
| *G21K 1/02* | (2006.01) |

(52) U.S. Cl.
CPC ............ *G01V 5/0025* (2013.01); *G21K 1/02* (2013.01)

(58) Field of Classification Search
CPC .......... G21K 1/00; G21K 1/025; G21K 1/067; G21K 1/10; A61B 6/06; A61B 6/032
See application file for complete search history.

(56) References Cited

U.S. PATENT DOCUMENTS

| | | |
|---|---|---|
| 5,930,326 A | 7/1999 | Rothschild et al. |
| 8,831,181 B2* | 9/2014 | Kreisler ............... A61B 6/4291 378/154 |

(Continued)

FOREIGN PATENT DOCUMENTS

| | | |
|---|---|---|
| EP | 0271723 A1 | 6/1988 |
| EP | 2589954 A1 | 5/2013 |

(Continued)

OTHER PUBLICATIONS

Search Report for Application No. GB1613072.6, dated Nov. 22, 2016.

(Continued)

*Primary Examiner* — Don K Wong
(74) *Attorney, Agent, or Firm* — Kevin E. West; Advent, LLP

(57) ABSTRACT

In one aspect, it is disclosed a detection system comprising: a plurality of detectors, each detector being configured to detect radiation scattered by an associated respective portion of a load to inspect, the radiation being scattered in response to the respective portion being irradiated by radiation transmitted through the portion; and a plurality of collimators associated with the plurality of detectors, each collimator of the plurality of collimators being associated with a respective detector of the plurality of detectors and being configured to, for each detector of the plurality of detectors: enable radiation scattered by the respective portion of the load to reach the associated detector of the plurality of detectors, and inhibit other scattered radiation from reaching the associated detector.

20 Claims, 17 Drawing Sheets

(56) References Cited

U.S. PATENT DOCUMENTS

2004/0174959 A1  9/2004 Green
2010/0034347 A1  2/2010 Rothschild

FOREIGN PATENT DOCUMENTS

| WO | 98/02763 | 1/1998 |
| WO | 2007/068933 A1 | 6/2007 |
| WO | 2010051366 A2 | 5/2010 |
| WO | 2011/106463 A1 | 9/2011 |

OTHER PUBLICATIONS

International Search Report and Written Opinion for PCT/GB2017/052202, dated Nov. 6, 2017.

\* cited by examiner

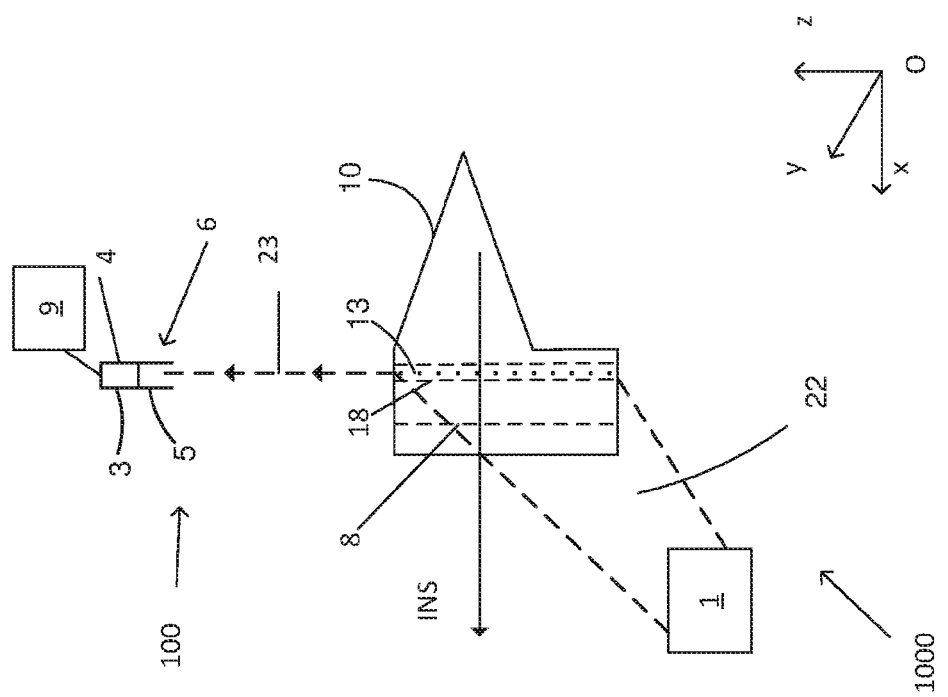
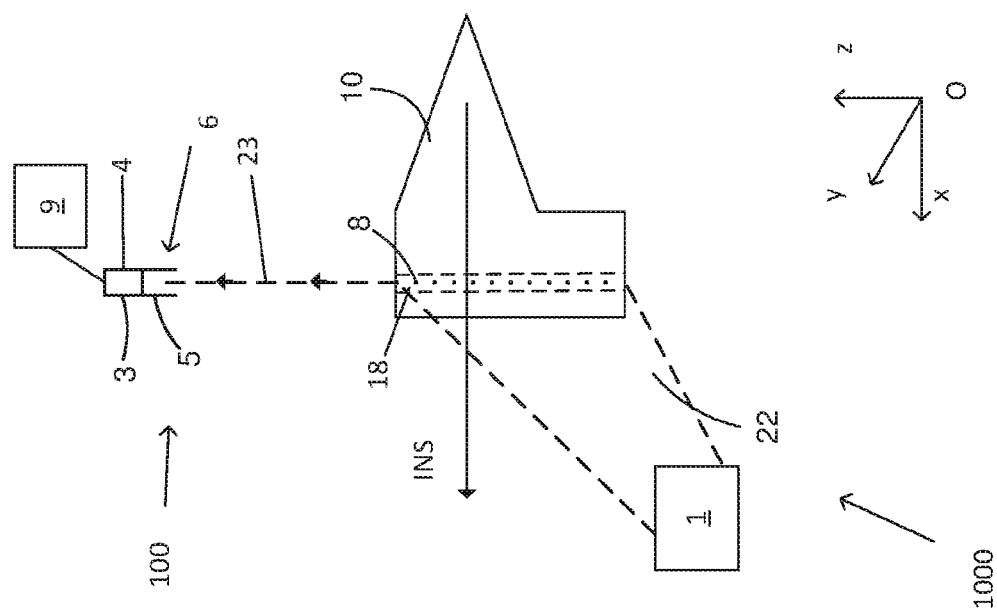
Figure 4
Figure 3

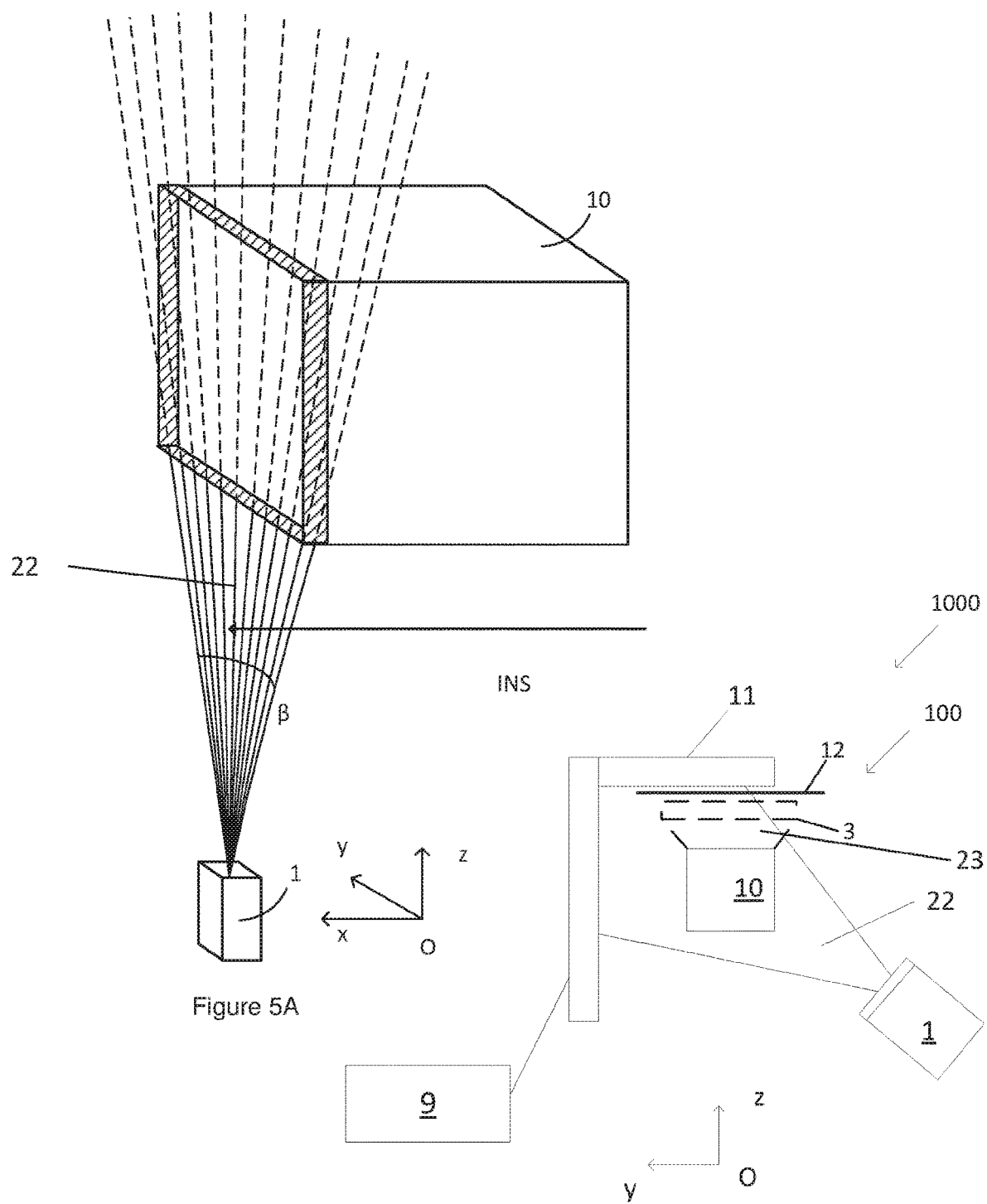

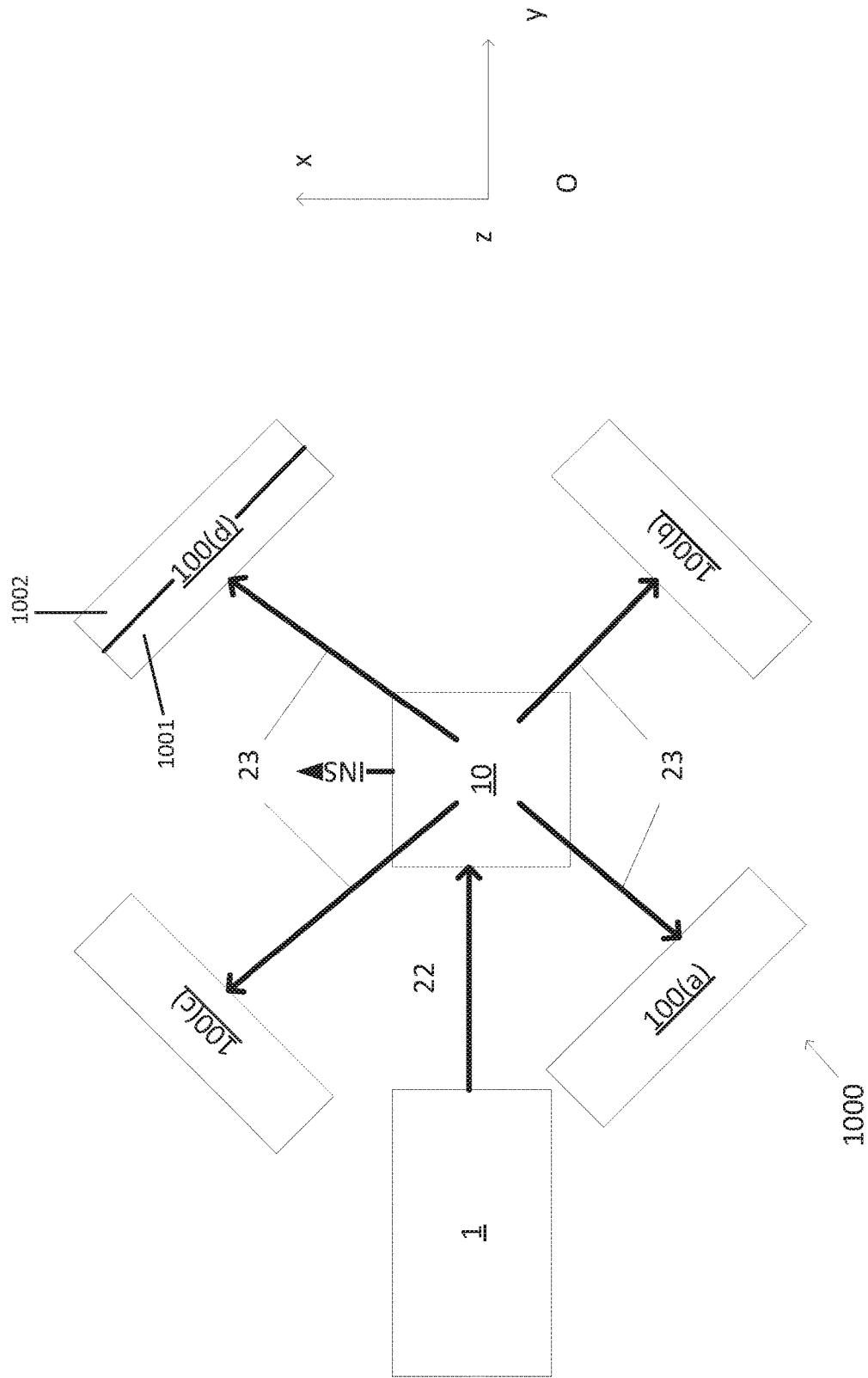

SCATTER IMAGING

FIELD OF INVENTION

The present disclosure relates, but is not limited, to systems and methods for inspecting a load with a source of radiation.

BACKGROUND

Inspection systems use inspection radiation through e.g. vehicles for inspecting cargo of the vehicle, for example to detect hidden objects (such as weapons or dangerous material).

However objects placed in the line of transmission of opaque materials and/or which appear dark on the view by transmission are difficult to detect on a view by transmission. A user may for example fail to detect some objects in X-ray images, because of their overlaps and/or their location in the line of transmission of low transmission objects.

Aspects of the present invention address some of the above issues.

SUMMARY OF INVENTION

Aspects and embodiments of the invention are set out in the appended claims. These and other aspects and embodiments of the invention are also described herein.

PRESENTATION OF THE FIGURES

Embodiments of the disclosure will now be described, by way of example only, with reference to the accompanying drawings, in which:

FIG. 3 shows a schematic 2D illustration of a first zone of a load being irradiated, and radiation scattered by the first zone passing towards detectors;

FIG. 4 shows a schematic 2D illustration of a second zone of the load of FIG. 3 being irradiated, and radiation scattered by the second zone passing towards detectors;

FIG. 5A shows a fan beam irradiating a zone of a load;

FIG. 5B shows an example apparatus irradiating a zone of a load with a fan beam;

FIG. 16 shows an example apparatus comprising a plurality of exemplary systems.

In the drawings, like elements are referred to by the same numerical references.

DESCRIPTION OF EXAMPLE EMBODIMENTS

Overview

Figure 1:
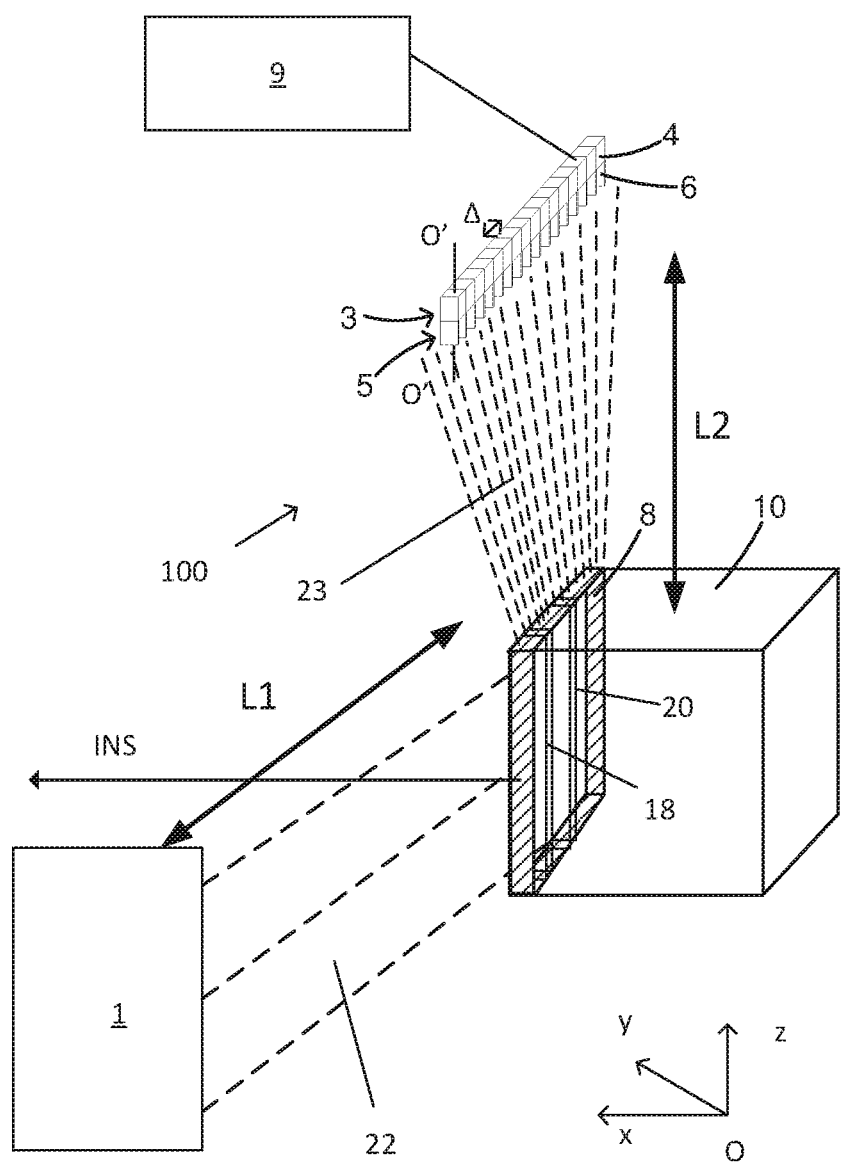
FIG. 1 shows a schematic 3D illustration of a zone of a load being irradiated and radiation scattered by the zone passing towards a plurality of detectors, each detector having an associated collimator.

Embodiments of the present disclosure relate to a system for inspection of a load. The system comprises a plurality of detectors to detect scatter radiation from the load, to allow one or more properties of the load to be determined. The scatter radiation is emitted by a zone of the load in response to the zone being irradiated by radiation transmitted through the zone. The irradiated zone comprises respective portions, each respective portion corresponding for example to a voxel of the zone. The system further comprises a plurality of collimators associated with the plurality of detectors, the plurality of collimators being configured to enable radiation scattered by a respective portion of the load to reach an associated detector in the plurality of detectors. The collimators inhibit any other scatter radiation to reach the associated detector. Each of the detectors of the plurality of detectors is associated with a respective portion of the load.

In some examples, the radiation irradiating the zone may be a fan beam irradiating the whole of the zone at the same time.

In some examples, the plurality of detectors comprises at least one linear array of detectors. Each of the detectors in the array may correspond for example to a pixel of a 1-dimensional (1D) image of the zone, generated from data associated with the array of detectors. In examples where the load is moved with respect to the detection system in an inspection direction, the system may enable a 2-dimensional (2D) image of the load to be obtained, e.g. by grouping the 1D images of the zone in a direction corresponding to the inspection direction. The 2D image of the load may enable an enhanced detection of hidden objects.

In some examples, the plurality of detectors comprises a matrix of detectors, and each of the detectors in the matrix may correspond for example to a pixel of a 2-dimensional (2D) image of the zone, generated from data associated with the matrix of detectors. In some examples, the 2D image of the zone may be referred to as a 2D slice (or cross section) of the load.

In examples where the load is moved with respect to the detection system in an inspection direction, the system may enable a 3-dimensional (3D) image of the load to be obtained, e.g. by grouping the 2D images of the zone in a direction corresponding to the inspection direction. The 3D image of the load may enable an enhanced detection of hidden objects.

Alternatively or additionally, in some examples, the radiation irradiating the zone may be a pencil beam irradiating a portion of the zone at a time. In such examples, the pencil beam may be travelled on the load to irradiate the zone of the load (sometimes referred to as the pencil beam "parsing" the load). In some examples, the pencil beam is travelled in a direction perpendicular to the direction of the pencil beam.

In examples where the plurality of detectors comprises a linear array of detectors and where the pencil beam irradiates the load in a direction parallel to the linear array, each of the detectors in the array may correspond for example to a pixel of a 1-dimensional (1D) image of the zone, generated from data associated with the array of detectors. In examples where the load is moved with respect to the detection system in an inspection direction, the system may enable a 2-dimensional (2D) image of the load to be obtained.

In examples where the plurality of detectors comprises a linear array of detectors and where the pencil beam parses the load in a direction perpendicular to the linear array, each of the detectors in the linear array may correspond for example to a pixel of a 2-dimensional (2D) image of the zone (e.g. cross section of the load), generated from data associated with the matrix of detectors. In some examples, the pencil beam may parse the load in a direction perpendicular to the linear array. For example, for a side view beam parsing the load, e.g. from a bottom part of the load to a top part of the load, the linear array may be located above the load, and the linear array may be parallel to the beam direction which is perpendicular to the parsing direction.

In examples where the load is moved with respect to the detection system in an inspection direction, the system may enable a 3-dimensional (3D) image of the load to be obtained.

Embodiments of the present disclosure relate to a detection system for inspection of a load. The system comprises a matrix of detectors to detect scatter radiation from the load, in order to allow one or more properties of the load to be determined. The scatter radiation is emitted by a zone of the load in response to the zone being irradiated by radiation transmitted through the zone. The irradiated zone comprises respective portions, each respective portion corresponding for example to a voxel of the zone. The system further comprises a selection device configured to enable radiation scattered by a respective portion of the load to reach an associated detector on the matrix. The selection device inhibits any other scatter radiation to reach the associated detector. Each of the detectors of the matrix is associated with a respective portion of the load and may correspond for example to a pixel of a 2-dimensional (2D) image of the zone, generated from data associated with the matrix of detectors. In some examples, the 2D image of the zone may be referred to as a 2D slice (or cross section) of the load.

In examples where the load is moved with respect to the detection system in an inspection direction, the system may enable a 3-dimensional (3D) image of the load to be obtained, e.g. by grouping the 2D images of the zone in a direction corresponding to the inspection direction. The 3D image of the load may enable an enhanced detection of hidden objects.

In some examples, the selection device may comprise an aperture in a block.

DETAILED DESCRIPTION OF EXAMPLE EMBODIMENTS

As illustrated in the Figures, the system may be described with reference to an orthonormal reference OXYZ, axis (Oz) being the ascending vertical, a plane YOZ being vertical, a plane XOY being horizontal, and a plane XOZ being vertical.

In the example of FIG. 1, a detection system 100 comprises a plurality 3 of detectors 4. In some examples, the plurality 3 of detectors 4 comprises at least one linear array of detectors (as illustrated in FIG. 1). Alternatively or additionally, the plurality of detectors comprises a matrix of detectors (as illustrated e.g. in FIG. 6B).

Each detector 4 may be configured to detect radiation 23 scattered by an associated respective zone, e.g. the zone 8 in the example of FIG. 1, of a load 10 to inspect. The radiation 23 is scattered in response to the respective zone 8 being irradiated by radiation 22 transmitted through the zone 8.

The detection system 100 further comprises a plurality 5 of collimators 6. Each collimator 6 of the plurality 5 may be associated with a detector 4 of the plurality 3 of detectors. The collimators 6 may be located at a proximity of the detectors 4, such as on the detectors 4 and/or between the detectors 4.

In the example of FIG. 1, the zone 8 comprises respective portions, e.g. respective portions 18 and 20.

In some examples, each detector 4 of the plurality 3 of detectors 4 is configured to detect the radiation 23 scattered by an associated respective portion (e.g. 18 or 20) of the load 10 to inspect. The radiation 23 is scattered in response to the respective portion being irradiated by the radiation 22 transmitted through the portion. As explained in greater detail below, in some examples the radiation 22 may comprise X-ray radiation and the detectors 4 of the plurality 3 may comprise, amongst other conventional electrical elements, X-ray detection detectors. Each of the X-ray detection detectors may be configured to measure an amplitude of a signal in a scintillator. Each ray of the scatter radiation 23 is emitted by the respective portion 18 or 20, respectively, when the radiation 22 irradiates the portion 18 or 20 of the load 10 (for example because of Compton scattering and pair production in examples of X-ray and/or gamma radiation). It should be understood that in some examples (e.g. when the radiation 22 is emitted as a fan beam), both portions 18 and 20 may be irradiated at the same time.

The scatter radiation 23 is emitted in all the directions. It should be understood that in a system 100 not comprising the plurality 5 of collimators 6 according to the disclosure, the scatter radiation 23 emitted in all of the directions, by all of the respective portions (e.g. the portions 18 and 20) of the zone 8, would be detected by each one of the detectors 4 of the plurality 3. Imaging of the zone 8 using data collected by the plurality of detectors 4 would not be possible.

Figure 2A:
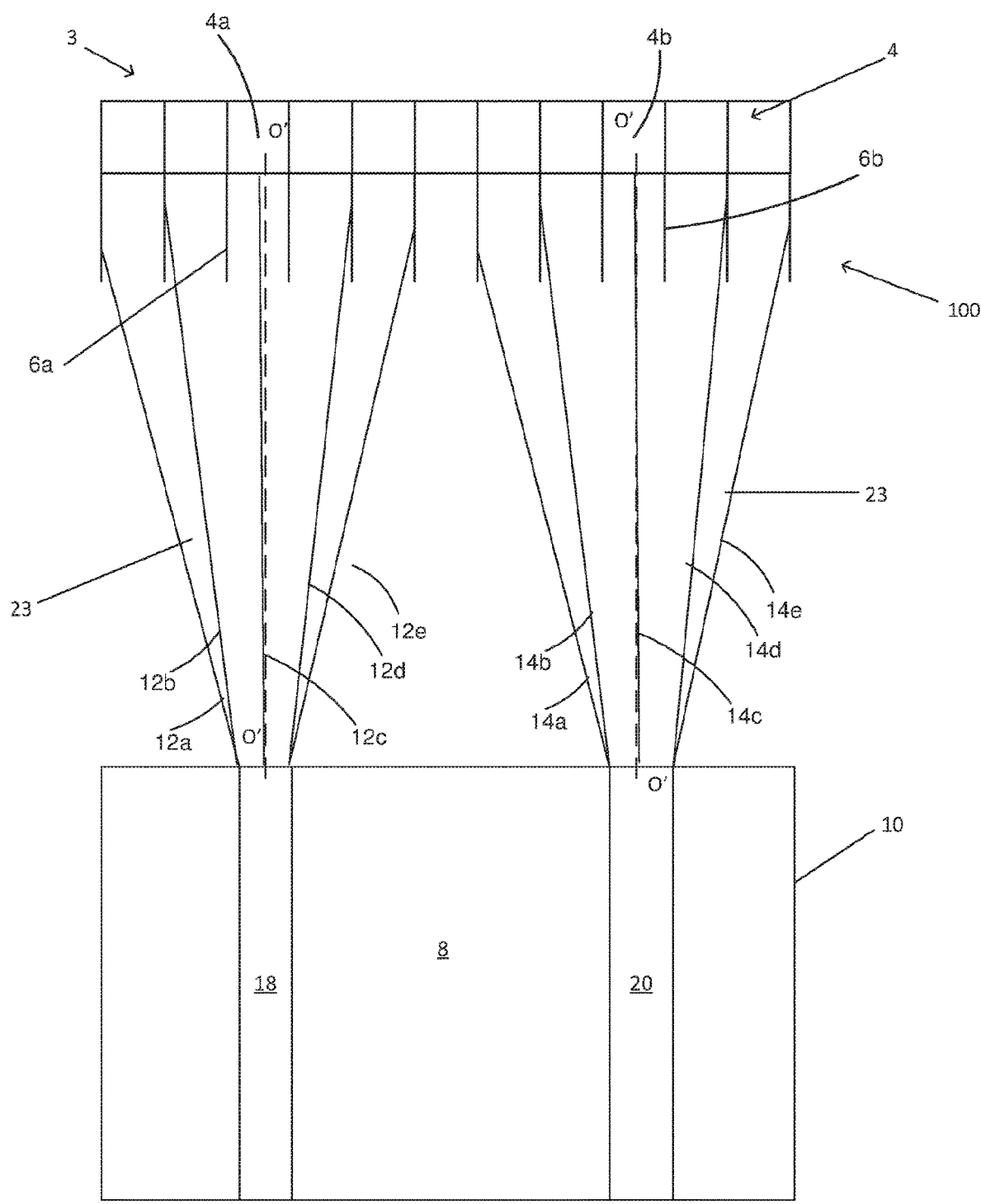
FIG. 2A shows a schematic illustration of scatter radiation passing through, or being inhibited by, collimators associated with detectors.

In the example of FIG. 1, each collimator 6 is configured to, for each detector 4 of the plurality 3, enable radiation 23 scattered by the respective portion (e.g. the portion 18) of the load 10 to reach the associated detector 4 of the plurality 3 of detectors, and inhibit other scattered radiation from reaching the associated detector. FIG. 2A (not to scale) shows an illustration of the system of FIG. 1 showing how the scatter radiation 23 passes through the collimators 6 to be received by the detectors 4. For illustrative purposes the illustration in FIG. 2A shows a selection of rays of the scatter radiation 23 emitted by two respective portions of the zone 8. In the example of FIG. 2A, the scatter radiation 23 from the portion 18 comprises rays in directions 12a-e, and the scatter radiation 23 from the portion 20 comprises rays in directions 14a-e.

In the example of FIG. 2A, the detector 4a is configured to detect radiation scattered by the associated respective portion 18 of the load 10 to inspect. In some example, the collimator 6a associated with the detector 4a defines a direction of collimation (O'-O') (sometimes referred to as a line of sight) which intersects both the detector 4a and the collimator 6a, and the detector 4a and the portion 18 are associated with each other. In some examples, the detector 4a, the collimator 6a and the portion 18 are aligned on the direction of collimation (O'-O') (or line of sight) defined by the collimator 6a. Similarly, the detector 4b is associated with the portion 20 and is configured to detect radiation scattered by the associated respective portion 20 of the load 10 to inspect. In some examples, the detector 4b, the collimator 6b and the portion 20 are aligned on the direction of collimation (O'-O') (or line of sight) defined by the collimator 6b.

In the example of FIG. 2A, the radiation 23 emitted from the portion 18 in the direction 12c is almost parallel to the direction (O'-O') and thus passes through the collimator 6a to the detector 4a associated with the portion 18. In the example of FIG. 2A, the scatter radiation 23 emitted by the portion 18 in other directions (e.g. in this illustration radiation 23 emitted in directions 12a, 12b, 12d and 12e) is inhibited from passing to the detector 4a by the collimator 6a. Similarly, the scatter radiation 23 emitted by other portions (e.g. portion 20 as explained below) is also inhibited from passing to the detector 4a by the collimator 6a.

Similarly, in this illustration, scatter radiation 23 from the portion 20 emitted in the direction 14c is almost parallel to the direction (O'-O') and thus passes through the collimator 6b associated with the detector 4b, and reaches the detector 4b of the plurality 3 of detectors. In the example of FIG. 2A, the scatter radiation 23 emitted in directions 14a, 14c and 14d and 14e is inhibited from passing to the detector 4b by the collimator 6b. Similarly, the scatter radiation 23 emitted by other portions (e.g. portion 18 as explained above) is also inhibited from passing to the detector 4b by the collimator 6b.

Each of the collimators 6 is thus configured to allow the radiation 23 scattered from a respective portion, and in a certain direction parallel to a collimation direction defined by the collimator, to pass through the collimator 6 to reach the associated detector 4. The radiation scattered 23 by the respective portion in other directions (e.g. not parallel to the collimation direction) and the radiation scattered by other respective portions are prevented from passing through the collimator to the reach the detector associated with the respective portion.

Figure 2B:
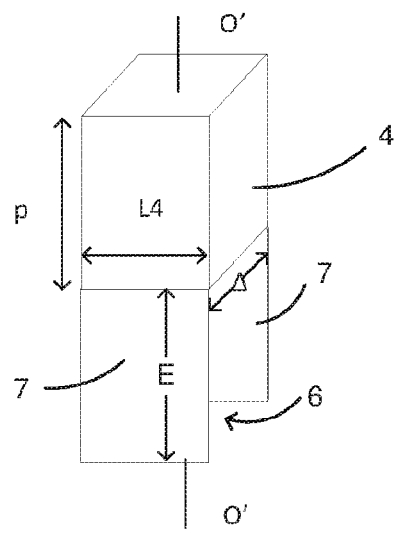
FIG. 2B shows a schematic illustration of a collimator associated with a detector.

In some examples, as illustrated by FIG. 2B (not to scale), each collimator 6 comprises at least two partitions 7 configured to block or at least attenuate scatter radiation (e.g. a partition between the successive detectors, in examples where the plurality of detectors comprises a linear array of detectors). The at least two partitions may define the direction of collimation (O'-O'). In some examples, each collimator 6 may comprise four partitions 7 (e.g. a partition between each of the detectors, in examples where the plurality of detectors comprises a matrix of detectors).

The partitions 7 may extend in an extension direction parallel to the direction (O'-O') of collimation of the collimator 6. Each partition 7 may comprise a sheet of lead or steel, but other configurations and materials are envisaged.

As illustrated by FIG. 2B, the collimator 6 may define a ratio r between a dimension Δ of the detector 4 corresponding to a width of the detectors (e.g. in a direction of a desired resolution) and an extension E of the partitions 7 in the extension direction such that:

$$2 \le r = \frac{E}{\Delta} \le 50.$$

It should be understood that a selectivity of the collimator with respect to the scattered radiation which is enabled to reach the associated detector increases as the ratio r increases. With relatively higher values of r, only a small portion of the scattered radiation (e.g. scattered radiation almost parallel to the direction of collimation) may reach the detector (e.g. in applications where the radiation received on the detectors is relatively high (e.g. for relatively high doses), the final image may be relatively not blurred), whereas relatively lower values of r may enable more scatter radiation to reach the detector (e.g. from some non-associated other portions of the load, and the final image may be relatively more blurred, but more radiation is detected by the detector). A compromise between the blurring of the image and the quantity of radiation detected by the detector may be found, for each application of the system.

In some examples, each of the collimators 6 is configured such that each respective portion (e.g. the portion 18 or 20, respectively) corresponds to a voxel of the load 10, and/or each respective detector 4 corresponds to a pixel of an image of the load generated using data associated with the plurality 3 of detectors 4. As illustrated in FIG. 1, in examples where the plurality 3 comprises a linear array of detectors 4, the voxel may correspond to a dimension of the load 10 (e.g. 1D voxel, e.g. in a direction of transmission of the radiation 22), depending on the location of the plurality 3 of detectors 4 with respect to the load 10, as explained in greater detail below. As illustrated in FIG. 6B, in examples where the plurality 3 comprises a matrix of detectors 4, the voxel may correspond to a punctual dimension of the load 10.

In some examples as illustrated in FIG. 1, dimensions of the collimators 6 (e.g. the dimension E of the partitions 7) may be based on dimensions of the load to inspect; and/or a distance L1 between the load to inspect and a source 1 of radiation; and/or a distance L2 between the load to inspect and the plurality 3 of detectors.

Similarly, dimensions of the plurality 3 of detectors 4 may be based on dimensions of the load to inspect; and/or the distance L1 and/or the distance L2.

In some examples, dimensions of a detector 4 in the plurality of detectors may be based on a plurality of factors as explained below.

A depth p, illustrated on FIG. 2B and sometimes referred to as "thickness", in a direction parallel to the collimation direction (O'-O') may be based on an expected energy of the scatter radiation 23. Back scattered radiation (in a direction generally opposite the direction of transmitted radiation as emitted from the source) has less energy than front scattered radiation (in a direction generally in the direction of transmitted radiation as emitted from the source). In some examples, detectors 4 in a plurality 3 of detectors located at the opposite side of the source 1 with respect to the load 10 may be thicker than detectors 4 located on the source 1 side with respect to the load 10 to inspect. The thickness may also depend on the density of the detector material. In some examples, if plastic is used (e.g. because of low cost), then a relatively large thickness may be envisaged (e.g. 5 cm).

A width $\Delta$, illustrated e.g. on FIG. 2B, may be based on a desired resolution of the final image. If the load width is 2.5 m, and if a 1 cm resolution is desired, a plurality of detectors may comprise 250 detectors of 1 cm width $\Delta$;

if a 5 cm resolution is desired, a plurality of detectors may comprise 50 detectors of 5 cm width $\Delta$.

A length L4, illustrated on FIG. 2B, may be a compromise between a cost of the detector and a quantity of radiation detected by the detector. L4 could be as short as 1 cm and as long as 1 m or even more. It should be understood that a quantity of radiation detected by the detector increases with L4, but cost also increases with L4.

Figure 2C:
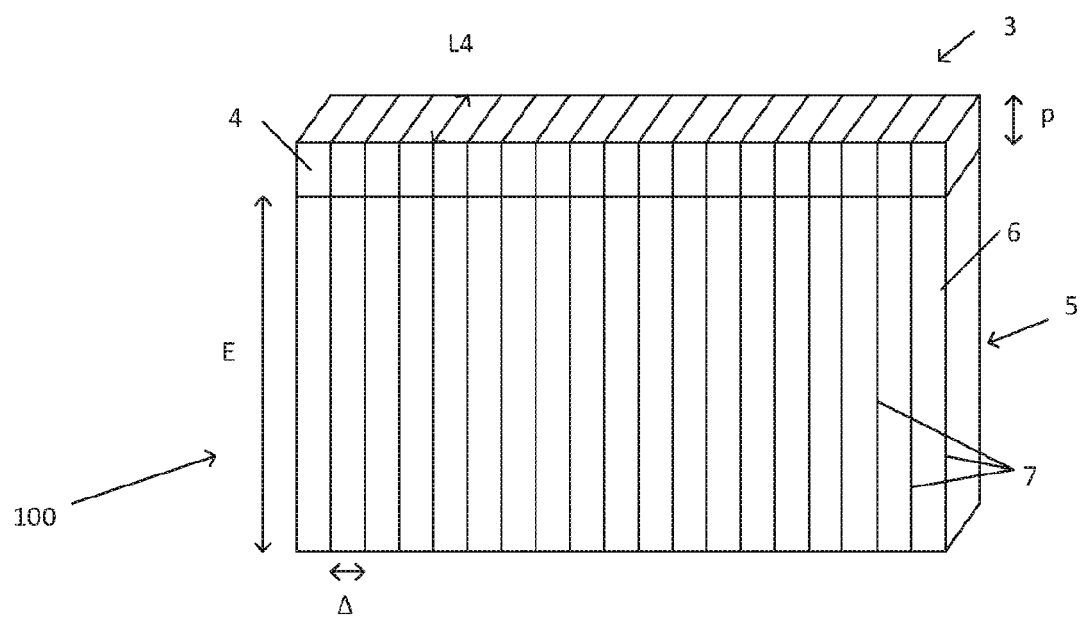
FIG. 2C shows a schematic illustration of a plurality of detectors associated with a plurality of collimators.

In the example illustrated by FIG. 2C, p may be equal to 5 cm (50 mm), $\Delta$ may be equal to 10 mm (1 cm), L4 may be equal to 500 mm (50 cm) and E may be equal to 500 mm (50 cm). It should be understood that if the thickness of the partitions 7 increases, the partitions 7 may relatively better inhibit scatter radiation from other, non-associated, portions of the load to reach the detectors, but the partitions 7 may also relatively hide more the detector 4 from the associated portion of the load. A compromise may be found for each application. In some examples, each partition 7 may have a thickness of 5 mm.

Figure 6A:
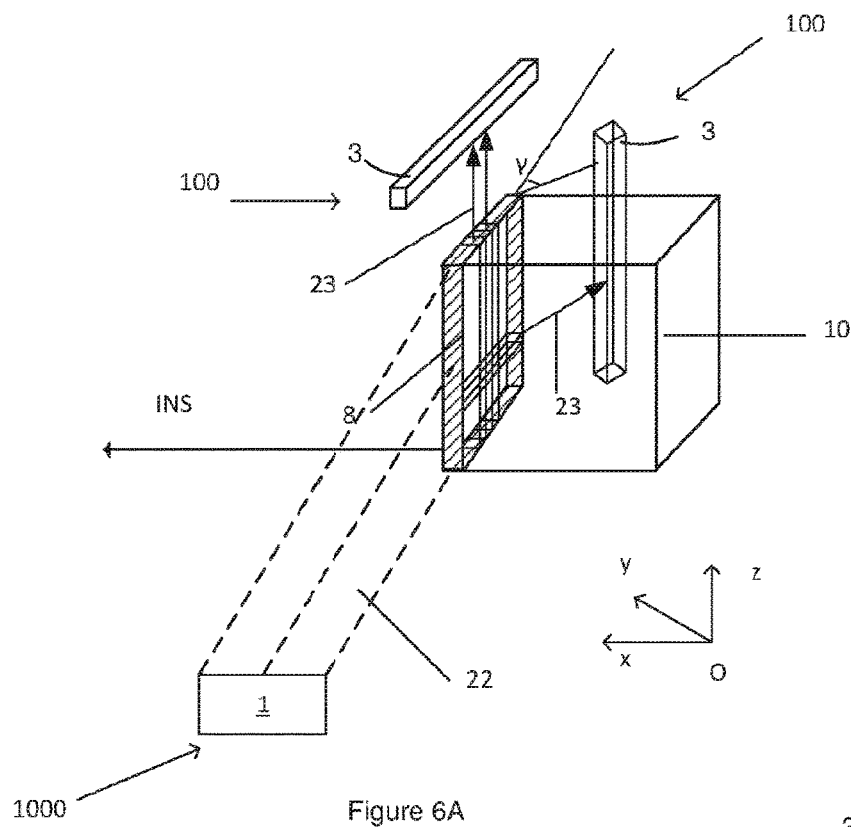
FIG. 6A shows a schematic perspective illustration of a plurality of systems positioned at different locations with respect to the load.
Figure 6B:
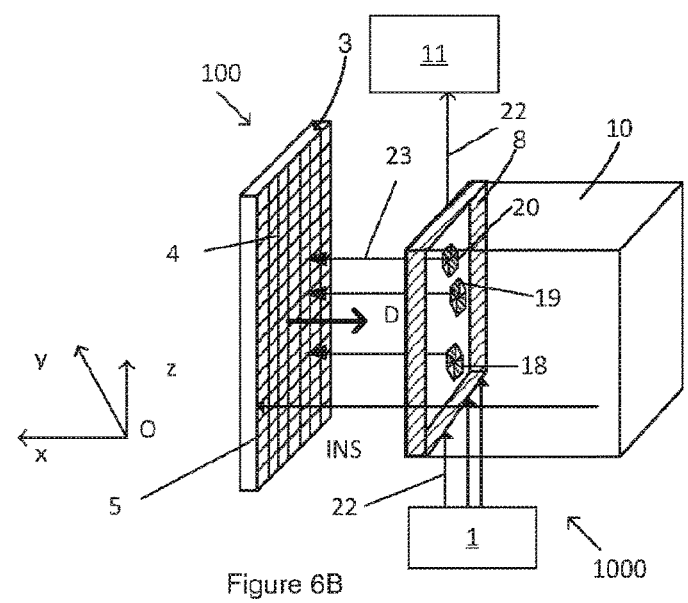
FIG. 6B shows a schematic illustration of a plurality of detectors comprising a matrix, positioned on an inspection direction of the load.
Figure 6C:
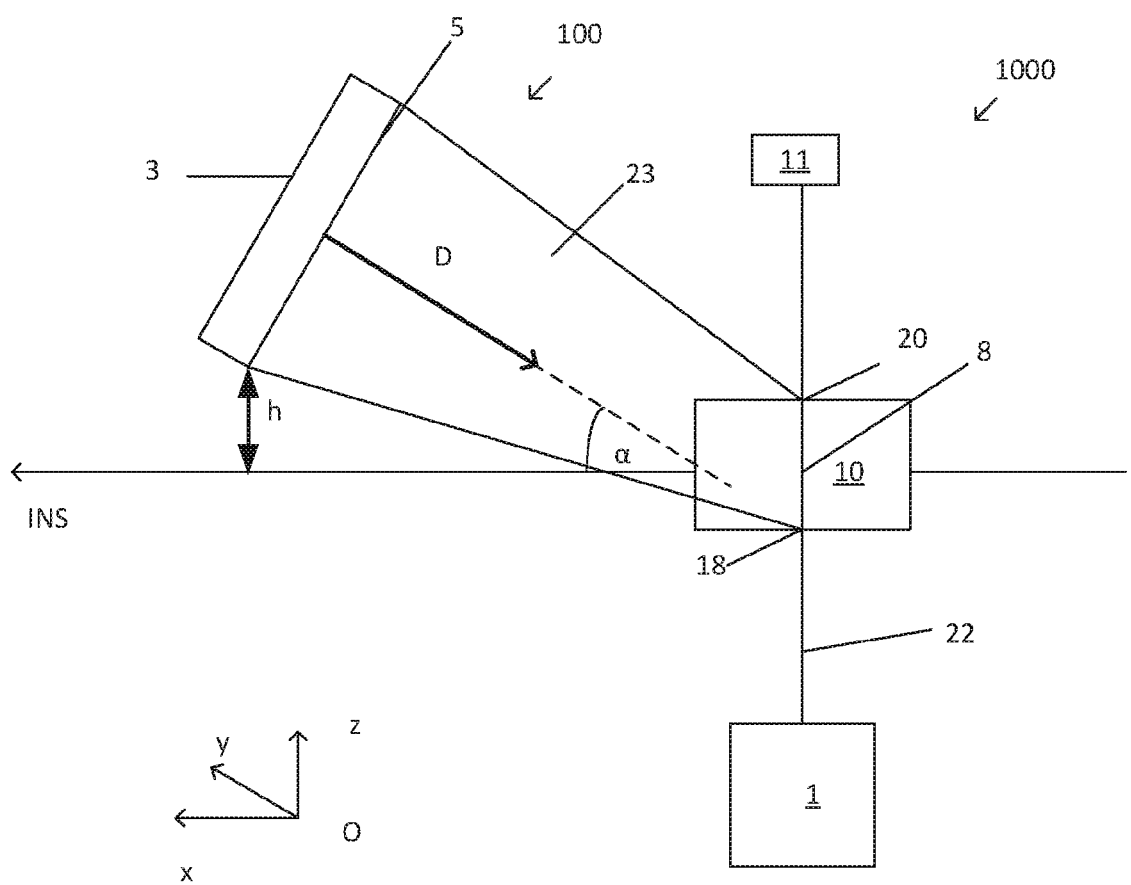
FIG. 6C shows an example system positioned at a distance from, and forming an angle with, an inspection direction of the load.
Figure 6D:
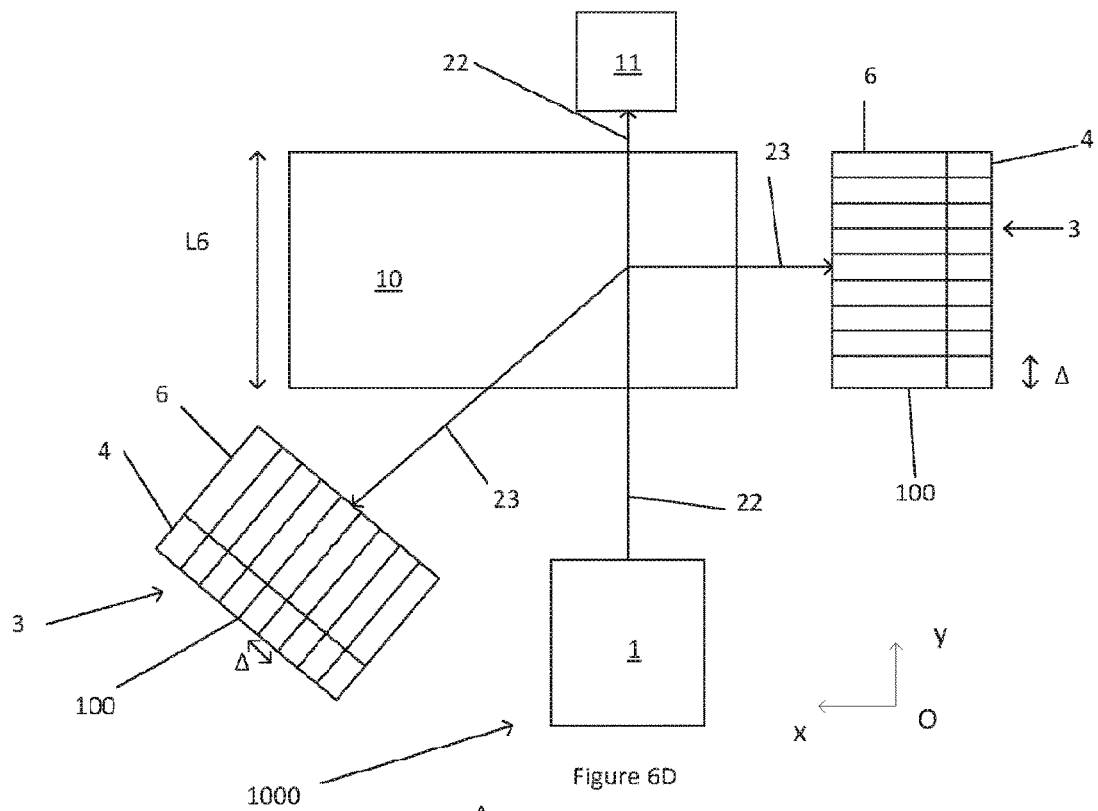
FIG. 6D shows a schematic top illustration of a plurality of systems positioned at different locations with respect to the load and of a transmission line of detection.
Figure 6E:
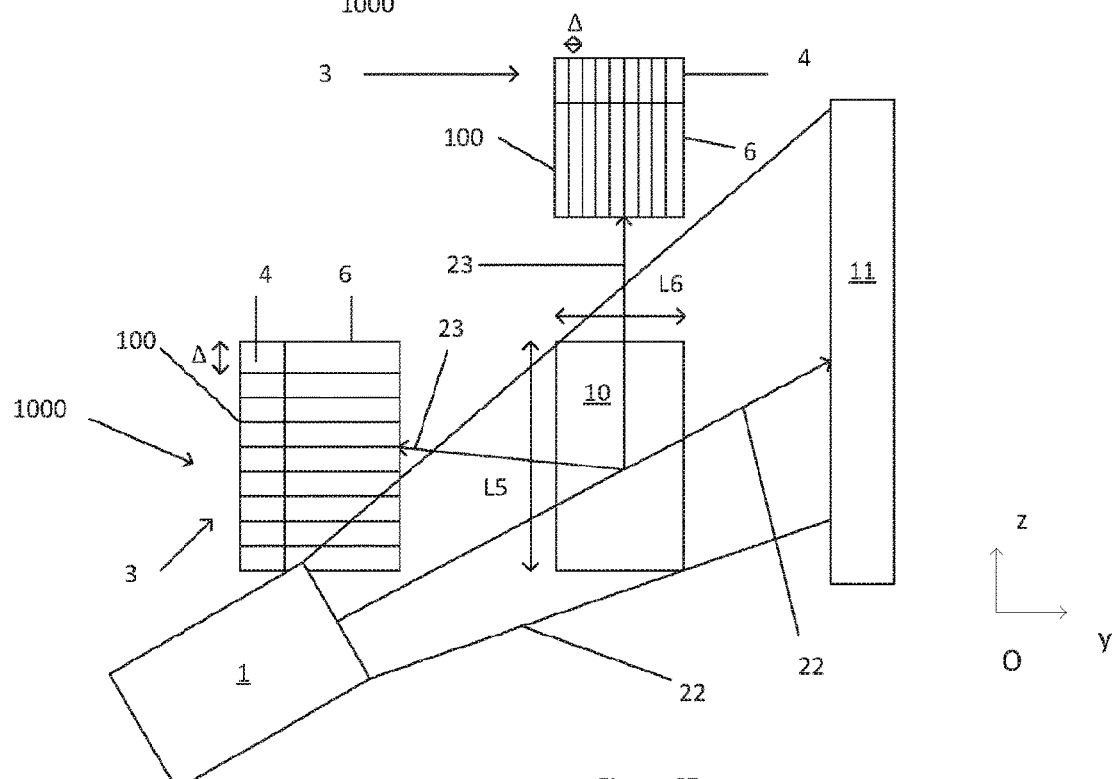
FIG. 6E shows, in a direction of inspection of the load, a schematic illustration of a plurality of systems positioned at different locations with respect to the load and of a transmission line of detection.

As illustrated in FIG. 6E, in examples where the plurality of detectors comprises at least one linear array of detectors, the linear array may have a length based on (e.g. equal to) a dimension of the load, such as a height L5 (e.g. in a direction parallel to the (Oz) axis) of the load 10 or a width L6 (e.g. in a direction parallel to the (Oy) axis) of the load. In examples where the plurality of detectors comprises a matrix of detectors, the matrix of detectors may have a ratio of dimensions based on a ratio of dimensions of the load. Examples of dimensions below are based on parallel collimation.

In some examples, and as illustrated in FIG. 6E, a size (e.g. length) of an array for a side view may be equal to the load height L5, e.g. equal to 5 m. In some examples, a resolution in a direction parallel to the (Oz) may be between 5 mm to 2 cm. The plurality 3 of detectors 4 may comprise, e.g. in a direction parallel to the (Oz) axis, any number of detectors 4, for example from 1000 detectors 4 of 5 mm width to 250 detectors 4 of 2 cm width. In some examples, and as illustrated in FIG. 6E, a size (e.g. length) of an array for a top view may be equal to the load width, e.g. to 2.5 m. In some examples, a resolution (in a direction parallel to the (Oy), as a non-limiting example) may be between 5 mm to 2 cm. The plurality 3 of detectors 4 may comprise (e.g. in a direction parallel to the (Oy) axis) any number of detectors 4, for example from 500 detectors of 5 mm width to 125 detectors 4 of 2 cm width.

Similarly, in some examples, and as illustrated in FIG. 6D, a size (e.g. width) of a plurality 3 (such as a matrix, but a linear array is also envisaged) of detectors 4 for a view and/or an angled front view may be equal to the load width L6, e.g. to 2.5 m. In some examples, a resolution in the width of the plurality 3 may be between 5 mm to 2 cm. The plurality 3 of detectors may comprise any number of detectors in that dimension, for example from 500 detectors of 5 mm width to 125 detectors of 2 cm width.

Other dimensions and distances are envisaged.

In the example of FIG. 1, the radiation 22 is emitted by the source 1.

In the example of FIG. 1, the radiation 22 is configured to be transmitted through the load 10. In the example of FIG. 1, the radiation 22 is shown as a collimated almost parallel beam irradiating the load 10 in a direction parallel to the (Oy) axis. However, other forms of beams are envisaged for the radiation 22, and other directions of irradiations are also envisaged. In some examples, the source 1 may be configured to irradiate the load 10 using a fan beam. An example of a fan beam is illustrated in FIG. 5A and has an angular width $\beta$ such that the load 10 may be irradiated across its width in a direction both parallel to the axis (Oy) and perpendicular to an inspection direction INS, parallel to the axis (Ox). In other examples, the load 10 may be irradiated by other types of beams, such as a pencil beam. In the example of FIG. 5B, the load 10 is irradiated by a fan beam in the (YOZ) plane, in a direction having an angle with respect to the (Oy) axis and the (Oz) axis.

In some examples, the source 1 may be configured to emit the radiation 22 for inspection of the load 10 by scatter radiation only. Alternatively or additionally, in some examples, and as illustrated e.g. in FIG. 5B, the source 1 may emit the radiation 22 for inspection of the load 10 by transmission of the radiation 22 through the load 10. In such examples apparatus 1000 comprising the system 100 may further comprise an additional detector 11 to detect the radiation 22 that has been transmitted through the load 10. The additional detector 11 may comprise, amongst other conventional electrical elements, radiation detection lines, such as X-ray detection lines.

In the examples described above, the load 10 is irradiated from one direction by a single source 1 of radiation 22. It should be understood that more than one radiation source may also be used, and the apparatus 1000 may thus comprise a plurality of sources 1. For example the load may be irradiated from more than one direction, from more than a source of radiation. Scatter radiation:

may have a greater level nearer a source of radiation, because the irradiating radiation has a greater flux; and/or may be more attenuated and/or affected by the load as the irradiating radiation travels in the load away from the source.

In some examples, irradiating the load by more than one source may enhance a quality of data corresponding to detected scatter radiation, e.g. detected nearer the respective source. In some examples, the scatter radiation from one or more sources 1 may be detected by a single detection system 100. The system 100 described above may be used in the apparatus 1000 which may also comprise the source 1. In some examples the apparatus may comprise a plurality of systems 100 according to any aspect of the disclosure.

In the example of FIG. 5B, shielding 12 is located between the plurality 3 of detectors and the additional detector 11, and is configured to inhibit any radiation scattered from the additional detector 11 to reach the plurality 3 of detectors, and vice versa. The shielding 12 is configured to inhibit (e.g. block or at least attenuate) the radiation scattered by the plurality 3 and/or the additional detector 11. The shielding 12 may comprise lead, but other materials are envisaged. The shielding 12 may form part of the apparatus 1000 external to the system 100, but in some examples the shielding may form part of the system 100. The shielding 12 may also be configured to inhibit the radiation 22 from the source 1 to reach the plurality 3 of detectors.

In some examples, the detection system 100 is movable with respect to the load 10. In some examples, the detection system 100 may remain static with respect to the ground and the load 10 is moved with respect to the ground in an inspection direction INS (e.g. parallel to the (Ox) axis on the Figures). The above mode of operation is sometimes referred to as a "pass-through" mode of operation. Examples of pass-through modes of operation include the load being a vehicle such as a truck. In some examples, a driver of the vehicle may drive the truck through the detection system 100, e.g. including a gantry. In some examples (e.g. where the radiation is relatively high), the apparatus 1000 may comprise a conveyor configured to carry the vehicle (such as the truck) through the system 100, e.g. at low speed (e.g. lower than 5 km/h). The above mode of operation is sometimes referred to as a "conveyor" mode of operation. Alternatively or additionally, the load 10 may remain static with respect to the ground and the detection system 100 may be moved with respect to the ground in the inspection direction. This mode of operation is sometimes referred to as a "scan" mode of operation.

FIGS. 3 and 4 show that the movement of the load 10 with respect to system 100 allows successive zones, e.g. zones 8 and 13, of the load 10 to be irradiated by the radiation 22 and therefore successively emit the scatter irradiation 23.

FIG. 3 and FIG. 4 illustrate an example of the detection system 100 of FIG. 1 in which the load 10 is moved with respect to the detection system 100, e.g. in the inspection direction INS parallel to the axis (Ox).

FIG. 3 shows the zone 8 of the load 10 being irradiated by the radiation 22. It should be understood that in some examples several (e.g. all of the) portions of the zone 8 may emit scatter radiation in response to being irradiated. However only the respective portion 18 (also shown in FIG. 1) is represented in FIG. 3, for the sake of clarity. The collimator 6 of the plurality 5 of collimators is configured to enable the radiation 23 scattered by the portion 18 to reach the associated detector 4 in the plurality 3 of detectors. A 1D image of the zone 8 (e.g. in a plane parallel to the (YOZ) plane) may be obtained.

In some examples, an analyser 9 may be configured to receive data from the plurality 3 (and/or the additional detector 11 when present) to generate one or more images, such as the 1D image. The analyser 9 conventionally comprises at least a processor and a memory. In some examples, the analyser 9 may form part of the apparatus 1000 external to the system 100 or may form part of the system 100.

FIG. 4 shows an example where the load 10 has moved in the inspection direction INS with respect to the detection system 100 and with respect to the position of the load 10 illustrated in FIG. 3. In this example, the load 10 is irradiated by the radiation 22 such that the zone 13 of the load 10 is irradiated and emits scatter radiation. Similarly to what has been described above with reference to the zone 8, a 1D image of the zone 13 in a plane parallel to the (YOZ) plane may be obtained.

It should be understood that in examples where the whole of the load is moved along the inspection direction INS and irradiated by the radiation 22, a 2D image of the load may be obtained, e.g. by combining all the obtained 1D images.

In some examples, the radiation irradiating the zones (e.g. the zones 8 and 13) may be a fan beam irradiating the whole of the zone at the same time. The 1D image may be obtained at the same time. Alternatively or additionally, in some examples, the radiation 22 irradiating the zone may be a pencil beam irradiating a portion of the zones (e.g. the zones 8 and 13) at a time. In such examples, the pencil beam may be travelled on the load to irradiate the zone of the load, and the 1D image is obtained after all of the portions of the zones have been irradiated. In some examples, the load 10 may be stopped during the travel of beam and/or correction may be applied by the analyser 9 to take into account the movement of the load during the travel of the beam.

In some examples, a plurality of views of the load 10 may be obtained using a plurality of systems (and one source or a plurality of sources of radiation). It should be understood that each system 100 may generate a view and hidden objects may be detected using the plurality of views. The one or more systems may be placed at different given positions in the apparatus, depending on the desired views. The one or more sources of radiation may be placed at different given positions in the apparatus, depending on the desired views. As illustrated in FIGS. 6A, 6B, 6C, 6D and 6E, an image of the load corresponding to a location of the plurality of detectors, with respect to the direction of inspection, may be generated.

It should be understood that in the present disclosure, "top" and "side" refer to a position of the plurality of detectors with respect to the load and/or with respect to each other. A top view may not be strictly vertical (e.g. not strictly parallel to the (OZ) axis) and may form an angle with respect to the (OZ) axis, and still be referred to as a top view. Similarly, a side view may not be strictly horizontal (e.g. not strictly parallel to the (XOY) plane) and may form an angle with respect to the (OY) and/or (OZ) axes, and still be referred to as a top view.

In some examples and as illustrated in FIG. 6A, if the plurality 3 of detectors 4 is located at a location corresponding to a top view (e.g. the plurality of detectors is parallel to the axis (Oy) in a plane parallel to the (YOZ) plane), then a top view of the load 10 may be obtained (e.g. as well as a transmission view in case the additional detector is present).

Alternatively or additionally, in some examples and as illustrated in FIG. 6A, if the plurality 3 of detectors 4 is located at a location corresponding to a side view (e.g. the plurality of detectors is parallel to the axis (Oz)), then a side view of the load may be obtained (e.g. as well as a transmission view in case the additional detector is present).

It should be understood that a number of scatter views may be obtained simultaneously, depending on the number of systems 100 placed around the load 10. The views of the load which may be obtained with one or more systems as illustrated in FIG. 6A are without any parallax.

As illustrated in FIG. 6A, in some examples one of the plurality 3 of detectors may be located at a location corresponding to a side view having an angle α different from 0 with respect to the vertical plane (YOZ), and may provide an enhanced view of hidden objects which may be difficult to detect (e.g. using strictly top (or side) views only), such as objects hidden in doors of a vehicle. In some examples, the direction of collimation (O'-O') of each collimator of the plurality 5 of collimators may correspond to the angle α. In the example of FIG. 6B, the plurality 3 may comprise a matrix such that the detection system 100 defines a main direction D of detection, the main direction of detection being perpendicular to the main direction INS of inspection of the load 10.

In the examples illustrated in FIG. 6B, the system 100 is positioned on the inspection direction INS. The above configuration of the system 100 enables a 2D slice (e.g. a cross section of the load) to be generated in a plane parallel to the plane (YOZ) using data detected by the matrix 3, without any parallax. In other words, the detection system 100 defines a main direction D (shown in FIG. 6B) of detection which is parallel to the inspection direction INS (and e.g. perpendicular to a main plane of irradiation of the load which is parallel to the (YOZ) plane in FIG. 6B).

The above configuration of the system 100 may be used, e.g. for relatively small loads. It should be understood that in the above configuration, the system 100 is positioned on the inspection direction INS, and prevents the system 100 from operating in e.g. a full pass-through mode and/or from inspecting relatively large loads, as the system 100 is in the way of the load 10.

In examples where the detection system 100 needs to operate in a full pass-through and/or conveyor mode, or where relatively large loads need to be inspected, the system 100 is not located on the inspection direction INS to enable the load 10 to move along the inspection direction INS. In such examples, and as illustrated in FIG. 6C, the system 100 may be positioned at a minimum distance h from the inspection direction INS and enables the load 10 to travel on the inspection direction INS without intersecting the detection system 100.

The main direction of detection D of the system 100 may form an angle α with respect to the inspection direction INS.

In the example of FIG. 6C, because of the distance h and/or the angle α relative to the inspection direction INS, the final image generated by data obtained by the detection system 100 may be distorted. In some examples, the analyser 9 may be further configured to compensate for the distance which is different for each pair (detector, voxel), based on the values of h and α, as the distance h and the angle α are known for a given detection system 100.

In the examples described above, the matrix 3 may be square or rectangular. Alternatively or additionally, in some examples the matrix 3 may have trapezoid shape based the above values of h and α.

In some examples, the radiation irradiating the zones (e.g. the zone 8) may be a fan beam irradiating the whole of the zone at the same time. The 2D image may be obtained at the same time. Alternatively or additionally, in some examples, the radiation 22 irradiating the zone may be a pencil beam irradiating a portion of the zones (e.g. the zone 8) at a time. In such examples, the pencil beam may be travelled on the load to irradiate the zone of the load, and the 2D image is obtained after all of the portions of the zones have been irradiated. In some examples, the load 10 may be stopped during the travel of beam and/or correction may be applied by the analyser 9 to take into account the movement of the load during the travel of the beam.

The system and apparatus may provide at least one relatively not expensive extra view (such as an extra top view) for an apparatus having a static gantry (e.g. using a pass-through and/or a conveyor mode described in greater detail below) and a single generator, or at least one relatively not expensive extra view (such as an extra side view) for an apparatus having a mobile detection system (e.g. using a scan mode) and a single generator. The system and apparatus may provide at least one relatively not expensive extra view (such as a top and/or side view, for example without parallax) for an apparatus having a single generator.

In examples where the plurality of detectors comprises a matrix of detectors, it should be understood that in some examples the cross sections of the load:

may overlap each other if the speed of the load is low compared to a frequency of irradiation of the load and/or of detection by the matrix, or may be slightly separated from each other if the speed of the load is higher than a frequency of irradiation of the load and/or of detection by the matrix.

In some examples, the analyser 9 may perform, at least partly, the combining of the cross sections to obtain the final 3D image.

As explained in greater detail below, the scatter radiation 23 emitted by a respective portion and/or a zone of the load 10 may be attenuated and/or affected by another portion and/or another zone of the load 10. In some examples the attenuation and/or impact of each of the other portions and/or zones of the load on the scatter radiation emitted by a current portion and/or zone may be dependent upon at least one property of other portions and/or zones of the loads, such as a material of the other portions and/or zones and/or an object located in the other portions and/or zones.

In some examples, the scatter radiation 23 emitted by a zone (e.g. a current zone) may be attenuated and/or affected by another zone (e.g. a preceding zone) prior to being received by the plurality 3 of detectors. Therefore the magnitude of and/or the data associated with the scatter radiation may not be totally representative of the current zone only. For example, the preceding zone of the load 10 (located between the current portion of the load 10 emitting the scatter radiation 23 and the plurality 3 of detectors) may be highly attenuating and/or may comprise an object which could affect the radiation emitted by the current zone. When the scatter radiation 23 passes towards the plurality 3 of detectors, it passes through the preceding zone of the load 10 and may therefore be attenuated or affected.

In some examples, the analyser 9 may be configured to process current data associated with the current zone (e.g. emitting scattered radiation because currently irradiated), to take into account one of the properties of the other zones of the load. In some examples and as explained above, the other zones may be the zones located between the current zone and the detection device 100.

In some examples the property of the other zones may be predetermined (e.g. measured by transmission). Alternatively or additionally, the other zones may correspond to zones which have previously emitted scatter radiation because they have been previously irradiated, and the property of the other zones may be have been previously detected using the detection system 100 and/or by another device 100 (for example from another view).

In some examples, the processing may take into account the property of the preceding zones by subtracting (e.g. accounting for impact by the preceding zones) and/or adding (e.g. accounting for attenuation by the preceding zones), from and/or to current data associated with the current zone, data corresponding to the preceding zones, in order to correct the current data to obtain more accurate information about the current zone.

In the developments above, the radiation scattered from a current zone may be attenuated and/or affected by another zone, i.e. in a direction parallel to the (Ox) axis (e.g. illustrated in FIG. 6B).

It should be understood that, similarly, the radiation scattered by a respective portion may be attenuated and/or affected by another respective portion, i.e. in a direction parallel to the (YOZ) plane (e.g. illustrated in FIG. 6B). Current data associated with a respective portion of the load emitting scattered radiation (e.g. portion 20 in FIG. 6B) may be affected by at least one property of another portion located in the plane parallel to the direction of transmission of the radiation 22 (e.g. the portion 18 or the portion 19 in FIG. 6B). Alternatively or additionally the processing performed by the analyser 9 may take into account the property of e.g. the portion 18 and/or 19 to correct the current data from e.g. the portion 20, to obtain more accurate information about the current portion 20.

The amount of radiation 23 scattered by a portion of the load decreases as the radiation 22 irradiating the portion is attenuated (e.g. an X-ray flux of the radiation 22 diminishes). In some examples, the X-ray incident flux diminishes with a coefficient in $d^2$, where d is the distance to a focal spot of the source 1. Alternatively or additionally, the analyser 9 is configured to process the current data associated with a current respective portion of the load emitting scattered radiation, to take into account a distance of the portion from the source of radiation, e.g. by applying a correcting coefficient based on the above coefficient in $d^2$.

Alternatively or additionally, in some examples, the analyser 9 may be configured to estimate a nature of a material of the load, based on a detection of a level of scattered radiation 23 and/or on a spectrum of energy of the scattered radiation by the plurality of detectors.

The level of scattered radiation 23 may be dependent upon the material producing the scatter radiation. Materials having a low Z number (like plastic or water) produce more scatter radiation 23 than materials having a high Z number (like lead or gold). A relatively high level of scattered radiation detected by the plurality of detectors may enable estimation that the irradiated zone comprises an organic material, whereas a relatively low level of scattered radiation detected by the plurality of detectors may enable estimation that the irradiated zone comprises a non-organic material. The system 100 may therefore enable estimation of what type of material is present in the load, based on the detected level of scatter radiation and/or based on a level of scatter photon energy distribution, which may also vary with the material present in the load. In an example, the system 100 may enable enhanced detection of hidden objects and/or certain materials (i.e. explosives) present in the load.

Figure 7:
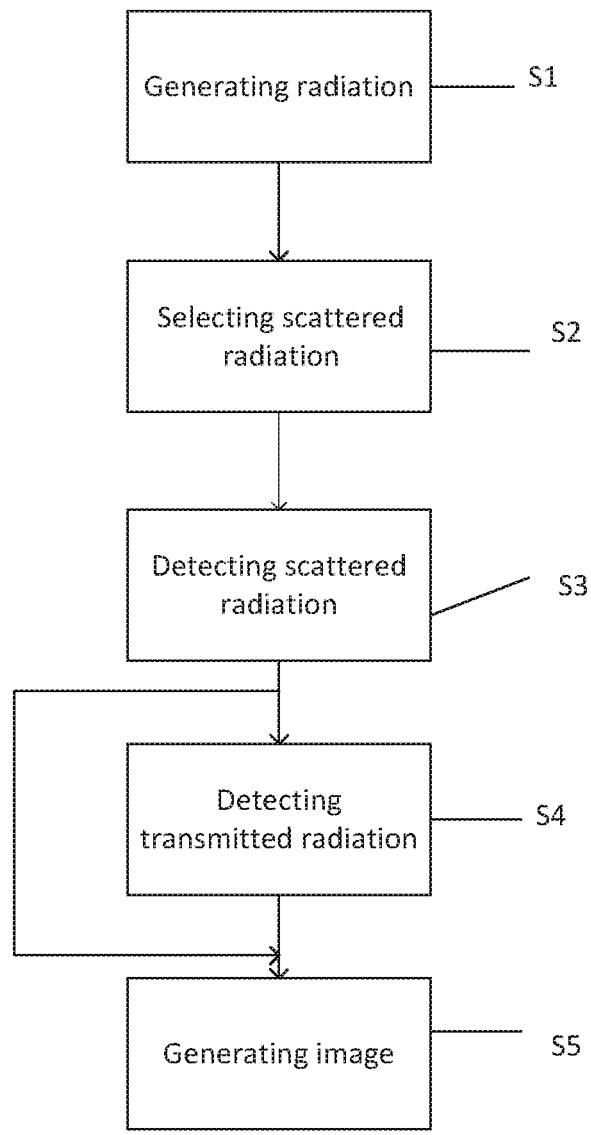
FIG. 7 shows a flowchart which illustrates an example method for inspecting a load.
Figure 8A:
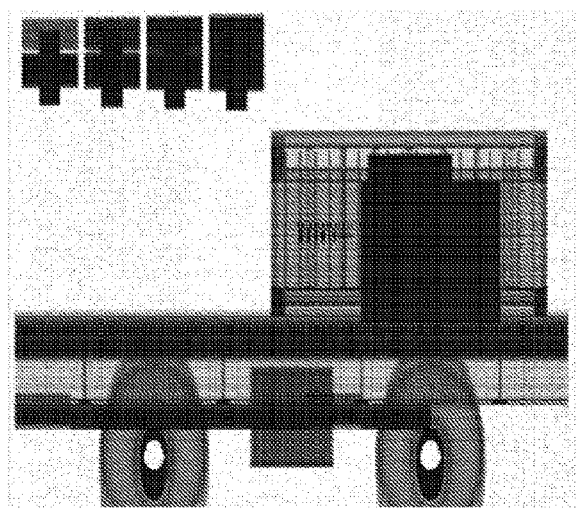
FIG. 8A shows a side view (final image) obtained by transmission.
Figure 8B:
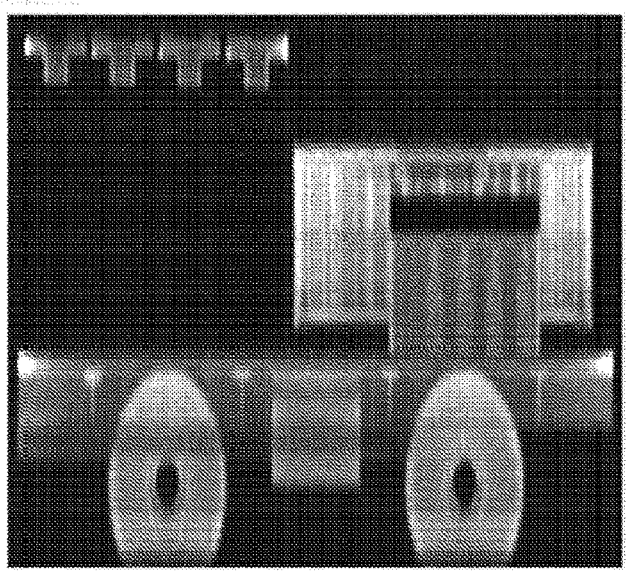
FIG. 8B shows a scatter side view (final image)
Figure 8C:
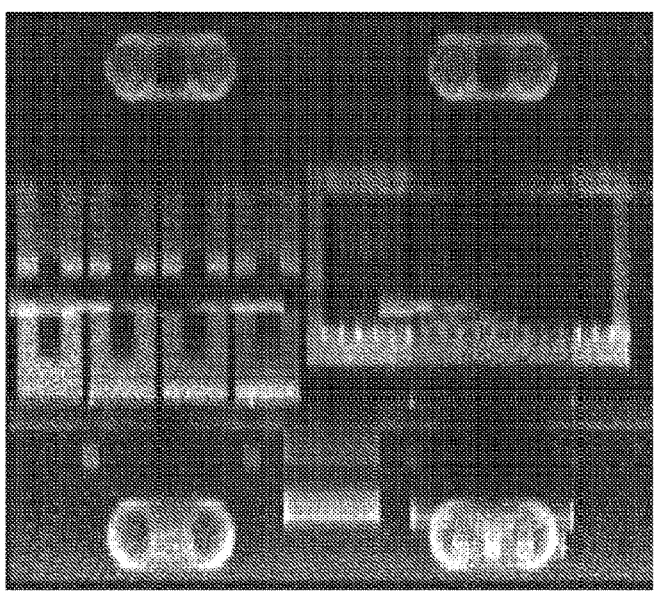
FIG. 8C shows a scatter top view (final image)

In some embodiments and as shown in FIG. 7, a method for inspecting one or more loads comprises:
  selecting (e.g. collimating), at S2, radiation scattered by each respective portion of a load to inspect, the radiation being scattered in response to the respective portion being irradiated by radiation transmitted through the portion, and.
  detecting, at S3, on each detector of the matrix, the radiation scattered by the associated respective portion of the load.
In some examples, the selecting performed at S2 comprises:
  enabling the radiation scattered by the respective portion to reach an associated detector of a plurality of detectors, and
  inhibiting any other scattered radiation from reaching the associated detector.
In some embodiments, the selecting performed at S2 may be performed by the plurality 5 of collimators 6 of the system of any one of the aspects of the disclosure.

In some embodiments, the detecting performed at S3 may be performed by the plurality 3 of detectors 4 of the system of any one of the aspects of the disclosure.

In some examples, the method illustrated in FIG. 7 may optionally comprise, at S1, emitting radiation for irradiation of the loads to inspect.

In some embodiments, the emitting performed at S1 may be performed by the source 1 of the apparatus and/or system of any one of the aspects of the disclosure.

In some examples, the method illustrated in FIG. 7 may optionally comprise, at S4, detecting radiation after transmission through the load.

In some embodiments, the detecting performed at S4 may be performed by the additional detector 11 of the apparatus and/or system of any one of the aspects of the disclosure.

In some embodiments, the method of FIG. 7 may further comprise generating, at S5, an image (such as 2D and/or 3D) of the load, e.g. by using data associated with the plurality of detectors and/or the additional detector (when present). In some examples generating the image further comprises processing data associated with the plurality of detectors of the detection system. In some examples, the data comprises current data associated with a current zone of the load emitting scattered radiation, to take into account at least one property of other zones of the load. In some examples, the data comprises current data associated with a current respective portion of the load emitting scattered radiation, to take into account at least one property of other portions in a plane parallel to a direction of transmission of radiation; and/or a distance of the portion from the source of radiation. In some examples, processing the data comprises compensating for a difference in a distance between the detectors of the plurality of detectors to the load caused by the detection system defining a main direction of detection forming an angle with respect to a direction of inspection of the load, and/or the detection system being positioned at a distance from the direction of inspection of the load. In some examples, processing the data further comprises estimating a nature of a material of the load, based on a detection of a level of scattered radiation and/or on a spectrum of energy of the scattered radiation.

In some embodiments, the generating performed at S5 may be performed by the analyser 9 of the apparatus and/or system of any one of the aspects of the disclosure.

In another aspect of the present disclosure, there is described a computer program product comprising program instructions to program a processor to carry out a method according to any aspect of the disclosure, or to program a processor to provide a system and/or apparatus and/or imager of any aspect of the disclosure.

Another example embodiment is disclosed below. Features and properties which are common and/or similar to other embodiments which were already described above are not disclosed in detail below, for the sake of clarity.

Figure 9:
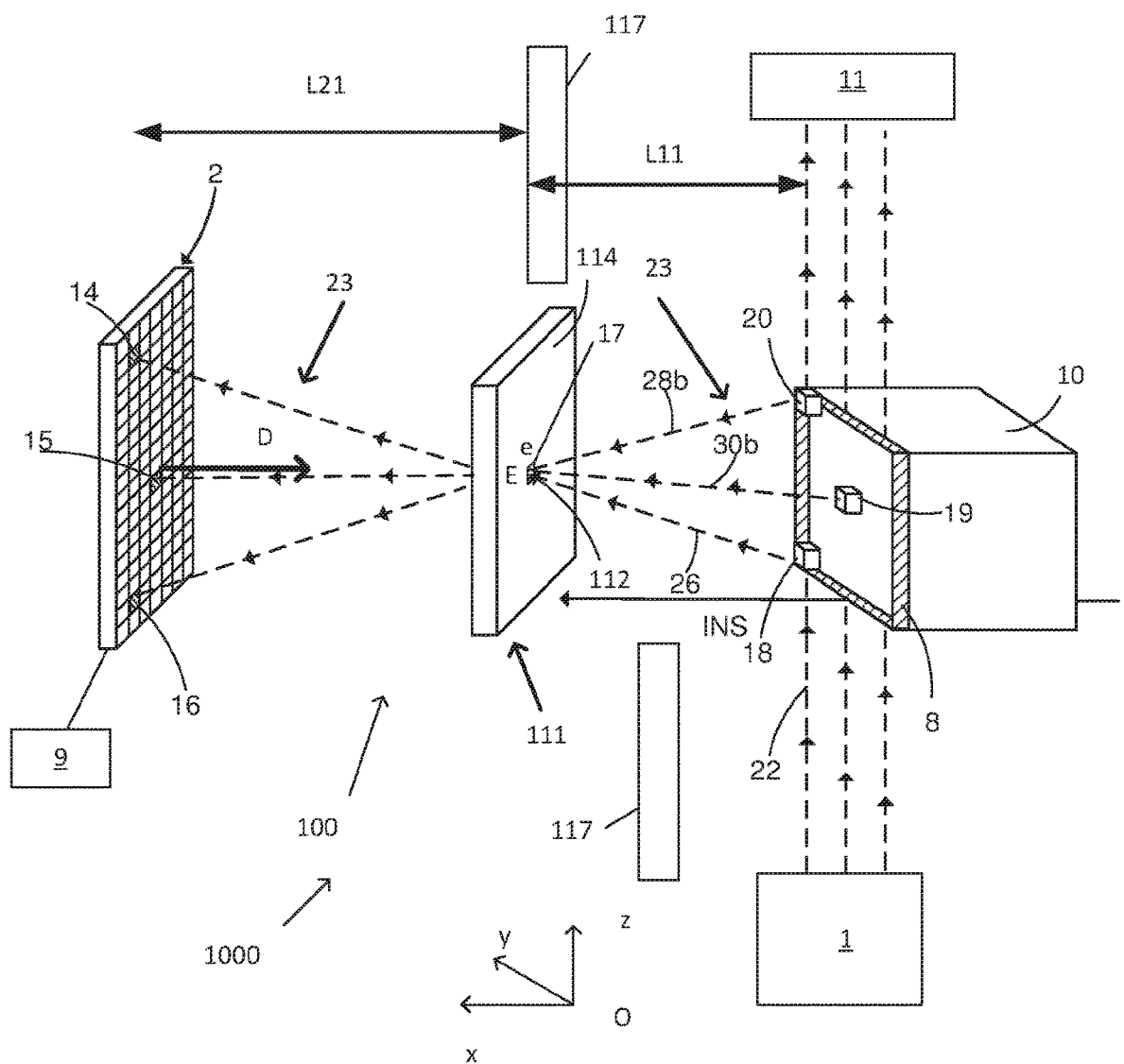
FIG. 9 shows a schematic illustration in perspective of a load being irradiated and radiation scattered by the load passing through an aperture to a detector.

In the example of FIG. 9, a detection system 100 comprises a matrix 2 of detectors (some detectors are referred to as e.g. detector 14, 15 or 16 in FIG. 9) and a selection device 111 comprising an aperture 112.

Each detector 14, 15 or 16 of the matrix 2 of detectors is configured to detect radiation 23 scattered by an associated respective portion (e.g. some portions are referred to as e.g. portion 18, 19 or 20, respectively, in FIG. 9) of a load 10 to inspect. The radiation 23 is scattered in response to the respective portion 18, 19 or 20 being irradiated by radiation 22 transmitted through the portion 18, 19 or 20, respectively.

Each ray of the scatter radiation 23 is emitted by the respective portion 18, 19 or 20, respectively, when the radiation 22 irradiates the portion 18, 19 or 20 of the load 10 (for example because of Compton scattering and pair production in the case of X-ray and/or gamma radiation). The scatter radiation 23 is emitted in all the directions.

As illustrated in FIG. 9, a zone 8 of the load 10 (the zone 8 comprising the respective portions 18, 19 or 20 in FIG. 9)

is irradiated by the radiation 22. The zone 8 of the load 10, upon being irradiated, emits the scatter radiation 23. In the example of FIG. 9, the respective portions 18, 19 and 20 are located in the zone 8, and each respective portion 18, 19 or 20 emits the scatter radiation 23 in a number of example directions.

In the example of FIG. 9, the aperture 112 of the selection device 111 is configured to enable radiation 26, 30b and 28b, scattered respectively by the respective portions 18, 19 and 20 of the zone 8 of the load 10, to reach the respective detectors 14, 15 and 16 of the matrix 2 of detectors. In the example of FIG. 9:

the portion 18 is associated with the detector 14, because the detector 14 is in the line of sight of the portion 18 through the aperture 112 (i.e. the detector 14, the aperture 112 and the portion 18 are aligned), the portion 19 is associated with the detector 15, because the detector 15 is in the line of sight of the portion 19 through the aperture 112 (i.e. the detector 15, the aperture 112 and the portion 19 are aligned), and the portion 20 is associated with the detector 16, because the detector 16 is in the line of sight of the portion 20 through the aperture 112 (i.e. the detector 16, the aperture 112 and the portion 20 are aligned).

In the example of FIG. 9 the scatter radiation 26, 30b or 28b corresponds, respectively, to the line of sight between the respective portion 18, 19 or 20 and the respective detector 14, 15 or 16, and is thus enabled to pass through the selection device 111 via the aperture 112.

Figure 10:
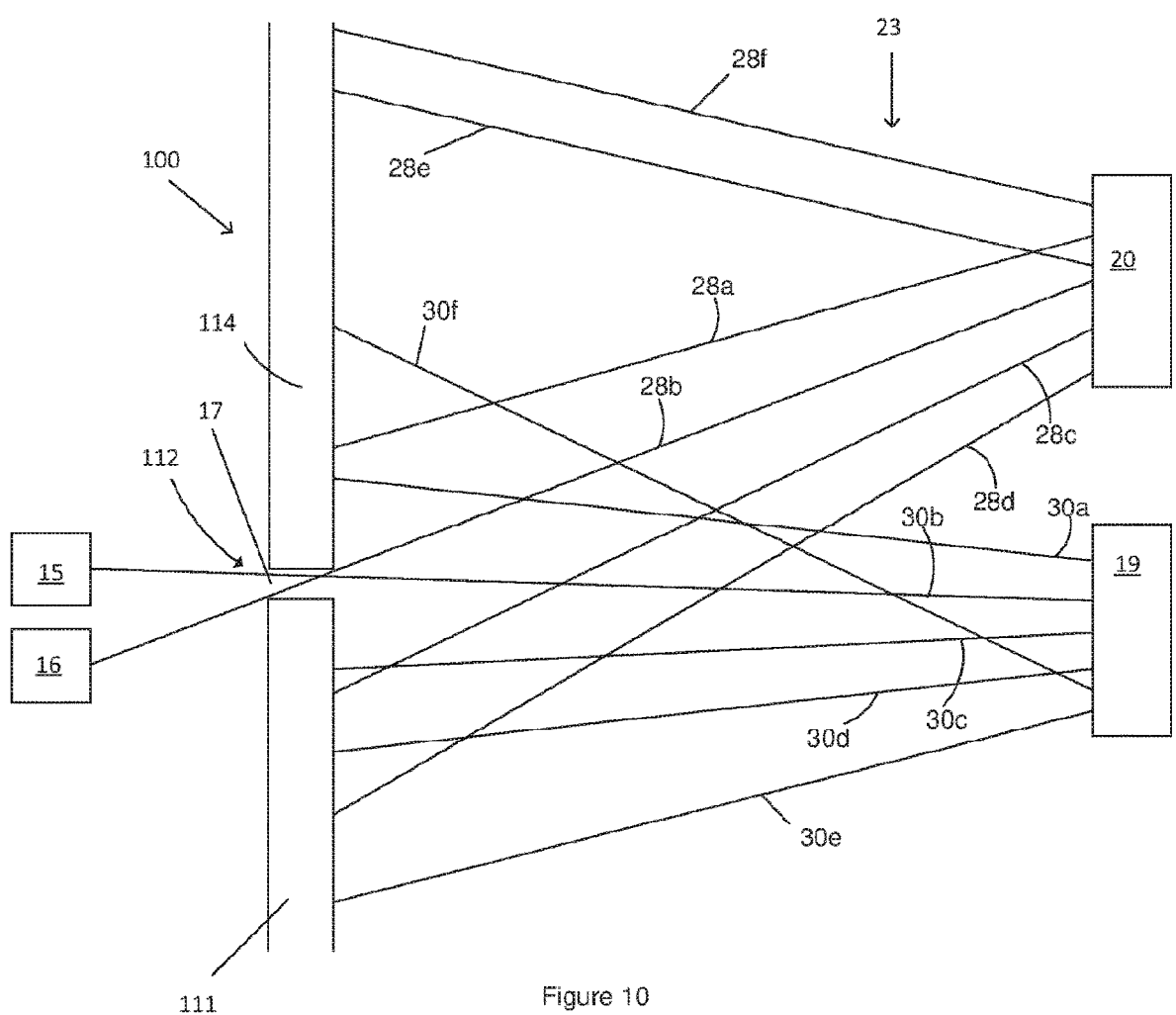
FIG. 10 shows a schematic illustration of scatter radiation passing through the aperture of FIG. 9.

FIG. 10 (not to scale) provides an illustration of a detail of the detection system 100 of FIG. 9, in which the respective portion 20 of FIG. 9 is emitting the scatter radiation 23 in example directions, such as directions referred to as 28a, 28b, 28c, 28d, 28e and 28f. In the example shown in FIG. 10, the scatter radiation 23 from the respective portion 19 of FIG. 9 is also emitting the scatter radiation 23 in example directions, such as directions referred to as 30a, 30b, 30c, 30d, 30e and 30f.

It should be understood that FIG. 10 is a simplified image showing a selection of rays of the scatter radiation 23 emitted by only two respective portions 19 and 20 of the zone 8 of FIG. 9. The number of respective portions and the scatter radiation emitted by each respective portion has been limited for illustrative purposes.

In the example of FIG. 10, the radiation emitted from the portion 20 in the direction 28b passes through the aperture 112 to reach the associated detector 16 of the matrix 2 of detectors. Similarly, the scatter radiation from the portion 19 in the direction 30b passes through the aperture 112 to reach the associated detector 15 of the matrix 2 of detectors.

The scatter radiation 23 emitted by the portion 19 is prevented from reaching the detector 16, because the portion 19 is not in the line of sight of the detector 16 (the detector 16 is not associated with the portion 19). The scatter radiation 23 emitted by the portion 20 is prevented from reaching the detector 15, because the portion 20 is not in the line of sight of the detector 15 (the detector 15 is not associated with the portion 20).

In some examples, the device 111 may comprise a block 114 and the aperture 112 may comprise a hole 17, the hole 17 being located in the block 114.

In some examples, the block 114 comprises a material that inhibits the scatter radiation from reaching the matrix 2. For example the block 114 may be made from a material (e.g., lead) that blocks or at least attenuates radiation, and therefore prevents radiation from reaching the matrix 2. In the example described above, the hole 17 may comprise an area without any material, to allow the desired scatter radiation to pass through the aperture 112 to reach the matrix 2. In such an example radiation that is able to pass through the hole 17 is not attenuated when passing through the hole 17.

In some examples, the aperture 112 may comprise a filter. In some examples a filter may enable reduction of noise.

In the example of FIG. 9, dimensions e and E of the aperture 112 of the device 111 are dependent on a distance L11 between the zone 8 and the device 111, and/or on a distance L21 between the matrix 2 and the device 111, and/or dimensions of the load to inspect.

In some examples, the dimensions e and E are predetermined such that:

each respective portion (such as the portion 18, 19 or 20) corresponds to a voxel of the zone 8 of the load 10 (e.g. as viewed from the detectors such as the detector 14, 15 or 16), and/or each respective detector (such as the detector 14, 15 or 16) associated with a respective portion detects the radiation scattered from the single voxel formed by the respective portion—each respective detector corresponds to a pixel of the matrix 2 viewed from the respective portion.

The selection device 111 enables imaging of the zone 8, using detection of the scatter radiation 23, because each one of the detectors of the matrix 2 is configured to be targeted by a unique voxel of the zone 8 and is configured to correspond to a pixel of a final 2D image of the zone 8. The final 2D image may be generated based on data collected by the detectors of the matrix 2.

In some examples, L11 may be greater than 1 m. In such examples, the system 100 may enable reduced noise (and may also avoid intersecting an inspection direction INS as described in greater detail below). In some examples, the matrix 2 may be relatively close to the load 10 and get a relatively large amount of scatter radiation 23. In some examples, L11 and L21 are such that L11+L21<5 m.

In some examples, L11 and L21 are such that L21<L11. In such examples, the matrix is smaller than a load slice and is relatively not as expensive as a matrix larger than a slice.

In some examples, L11 and L21 are such that:

1 m≤L11≤5 m, typically e.g. 2 m; and 0.3 m≤L21≤5 m, typically e.g. 1 m.

In some examples, e is equal to E, but any form ratio can be chosen for the aperture 112, e.g. depending on a form ratio of the load and/or the detectors of the matrix 2.

E and e may depend on dimensions of the detectors (e.g. pixel size) of the matrix 2. In examples E and e may have dimensions about half of the size of the detectors of the matrix 2. For example, for a slice of the load 10 having dimensions 5 m×3 m in a plane parallel to the (YOZ) plane (e.g. a cross section of the load), the matrix 2 may comprise 500×300 detectors (corresponding to a 500×300 resolution). In examples where L11=2 m and L21=1 m, the pixel size may be 5 mm×5 mm. In examples E and e may be such that E=2.5 mm and e=2.5 mm.

In some examples the device 111 may act as a diaphragm (e.g. a hole collimator). In the examples described above, the aperture 112 has a regular parallelepiped shape. It should be understood that, alternatively or additionally, the aperture 112 may have a truncated pyramid shape, with E and e dimensions being located at the truncated apex.

It should also be understood that the above dimensions are example dimensions for loads comprising e.g. vehicles and/or ISO containers. Other dimensions are envisaged, e.g. for applications including inspection of luggage.

Dimensions of the matrix 2 of detectors may be selected based on dimensions of the load to inspect. For example, the matrix 2 of detectors may have a ratio of dimensions (such as a height to width ratio) that is based on (e.g. smaller than or equal to) a ratio of dimensions (such as a height to width ratio) of the load. As described in greater detail below, in some examples the load 10 may have a size that corresponds to a standard size, and the matrix 2 of detectors may have a ratio of dimensions corresponding to that standard size (such as an ISO container).

Alternatively or additionally, the dimensions of the matrix of detectors may be dependent upon the distances L11 and/or L21. For example, a greater distance L21 between the aperture 112 and the matrix 2 of detectors may lead to a larger projection of the load onto the matrix of detectors (a relatively larger matrix of detectors may be required). Similarly a greater distance L11 between the aperture 112 and the load 10 may lead to a smaller projection of the load 10 onto the matrix 2 of detectors (a relatively smaller matrix of detectors may be required).

In some examples, the matrix may have dimensions corresponding to dimensions of a cross section of the load, multiplied by a L21/L11 ratio. In some examples, the matrix may have dimensions such that 2.5 m×1.5 m. In some examples, L21 may be reduced and the matrix may have smaller dimensions and be relatively less expensive.

Other dimensions and distances are envisaged.

In some examples, a source 1 may be configured to emit the radiation 22 for inspection of the load 10 by scatter radiation only. Alternatively or additionally, in some examples, and as illustrated e.g. in FIG. 9, the source 1 may emit the radiation 22 for inspection of the load 10 by transmission of the radiation 22 through the load 10. In such examples apparatus 1000 comprising the system 100 may further comprise an additional detector 11 to detect the radiation 22 that has been transmitted through the load 10. The additional detector 11 may comprise, amongst other conventional electrical elements, radiation detection lines, such as X-ray detection lines.

In the example of FIG. 9, shielding 117 is also located between the additional detector 11 and the matrix 2 of the system 100 and is configured to inhibit radiation scattered by the additional detector 11 from reaching the matrix 2, as in some examples the matrix 2 should detect the scatter radiation 23 only.

Figure 11:
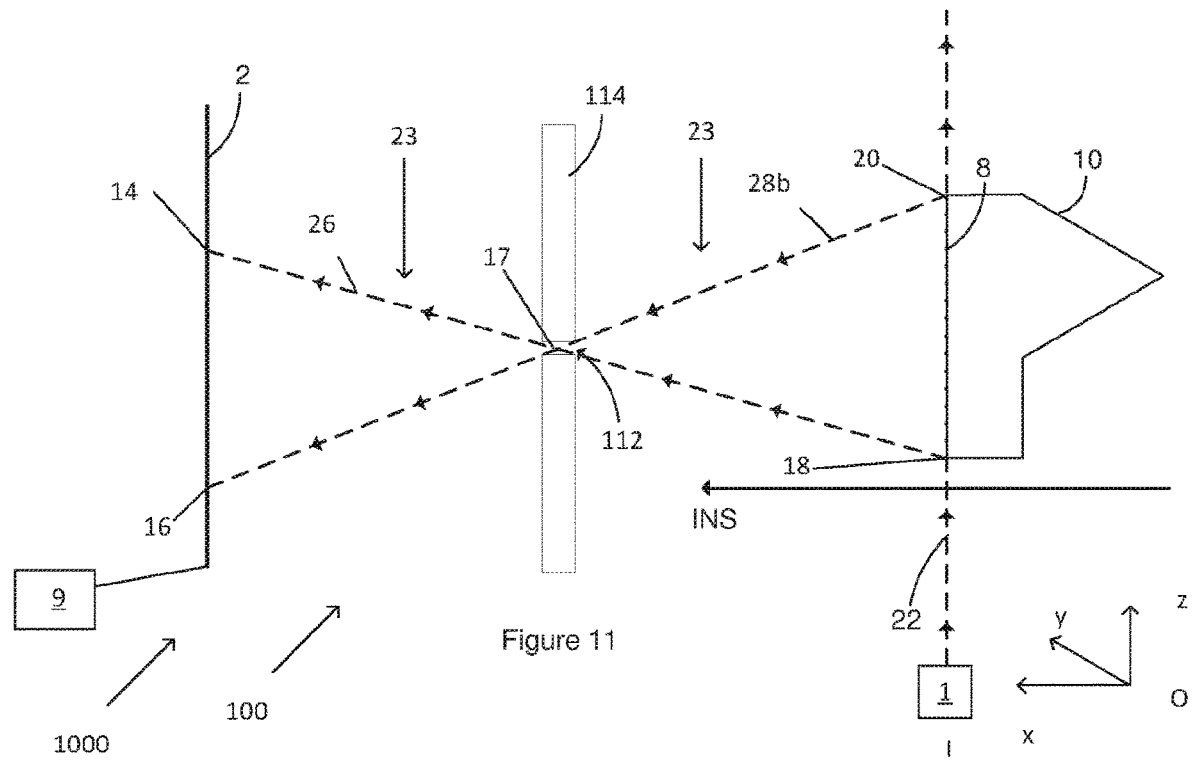
FIG. 11 shows a schematic elevation illustration of a first zone of a load being irradiated and radiation scattered by the first zone passing through an aperture to a detector.
Figure 12:
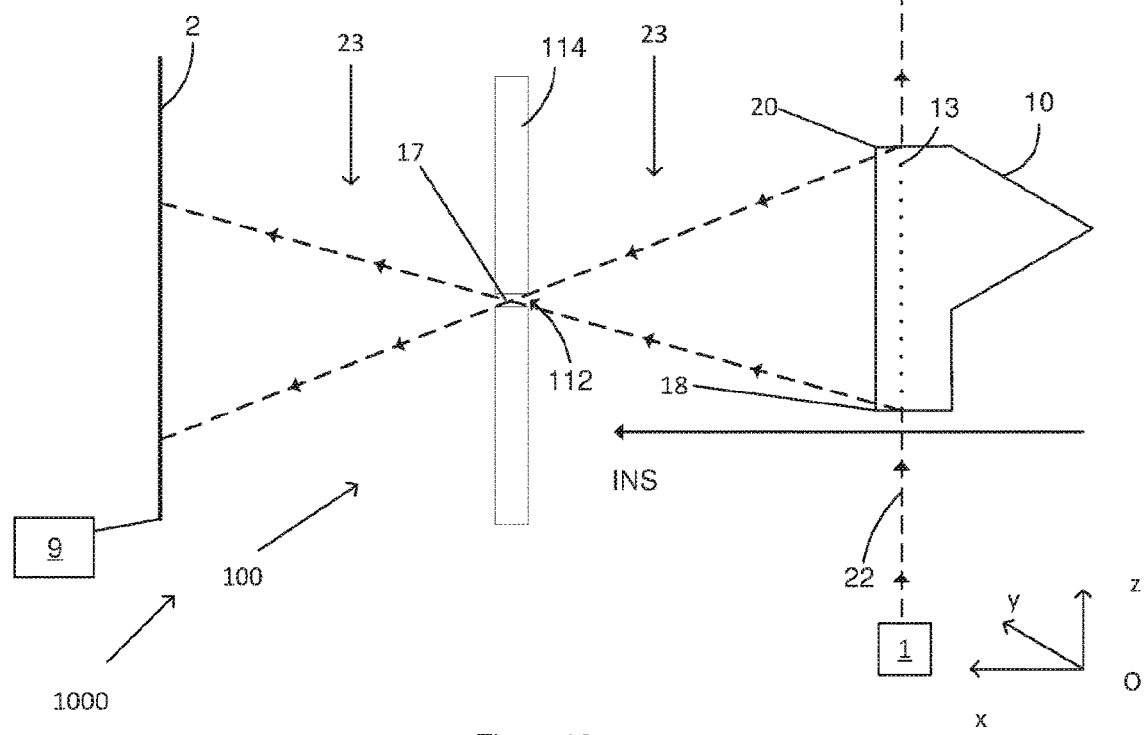
FIG. 12 shows a schematic elevation illustration of a second zone of the load of FIG. 11 being irradiated and radiation scattered by the second zone passing through an aperture to a detector.

FIGS. 11 and 12 show that the movement of the load 10 with respect to system 100 allows successive zones, e.g. zones 8 and 13, of the load 10 to be irradiated by the radiation 22 and therefore successively emit the scatter irradiation 23.

In the example shown in FIGS. 11 and 12, the load 10 has moved relative to the detection system 100 but the distances between the zone 8 or 13 being irradiated, the aperture 112 and the matrix 2 of detectors are the same both in FIG. 11 and in FIG. 12.

Figure 13:
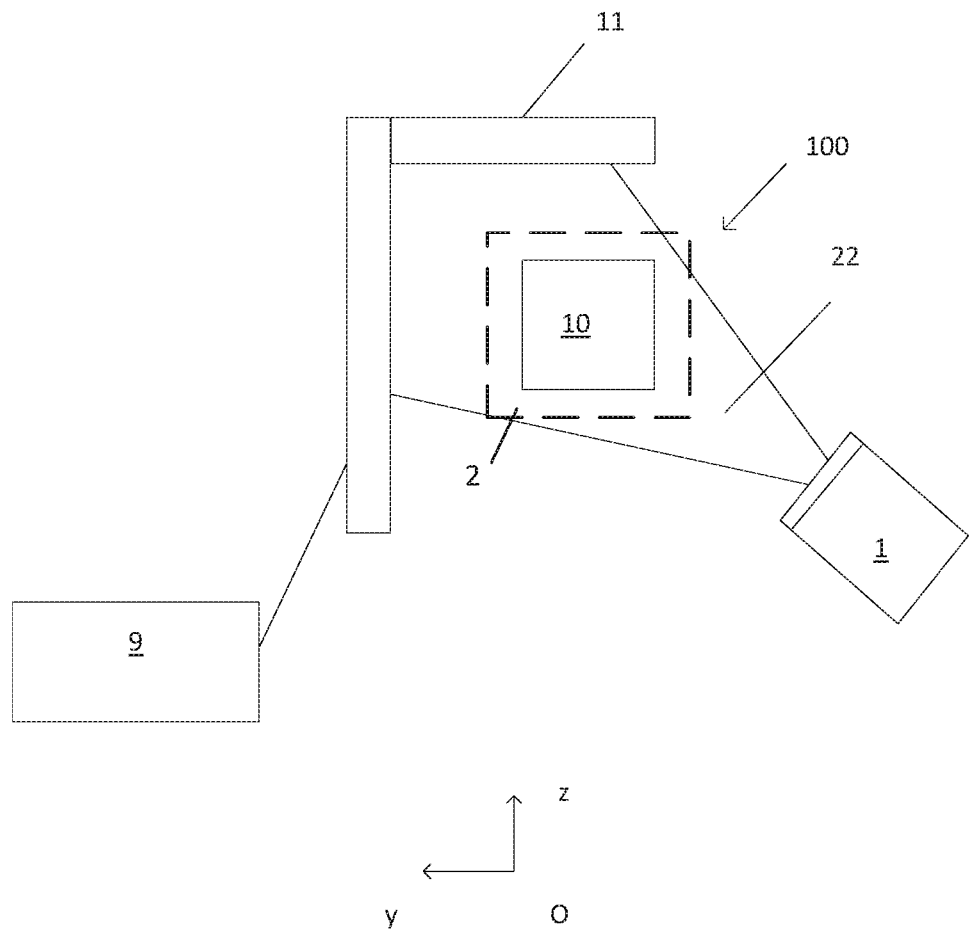
FIG. 13 shows an example apparatus irradiating a zone of a load with a fan beam.

An example of a fan beam is illustrated in FIG. 5A and has an angular width R. Using a similar fan beam, the load 10 may be irradiated across its width in a direction both parallel to the axis (Oy) and perpendicular to an inspection direction INS, parallel to the axis (Ox). In other examples, the load 10 may be irradiated by other types of beams, such as a pencil beam. In the example of FIG. 13, the load 10 is irradiated by a fan beam in the YOZ plane, in a direction having an angle with respect to the (Oy) axis and the (Oz) axis.

It should be understood that in some examples the 2D slices:

- may overlap each other if the speed of the load is low compared to a frequency of irradiation of the load and/or of detection by the matrix, or
- may be slightly separated from each other if the speed of the load is higher than a frequency of irradiation of the load and/or of detection by the matrix.

In some examples, an analyser 9 already described in connection with other embodiments may perform, at least partly, the combining of the slices to obtain the final 3D image.

As already explained in connection with other embodiments, the scatter radiation 23 emitted by a respective portion and/or a zone of the load 10 may be attenuated and/or affected by another portion and/or another zone of the load 10. In some examples the attenuation and/or impact of each of the other portions and/or zones of the load on the scatter radiation emitted by a current portion and/or zone may be dependent upon at least one property of other portions and/or zones of the loads, such as a material of the other portions and/or zones and/or an object located in the other portions and/or zones.

Figure 14:
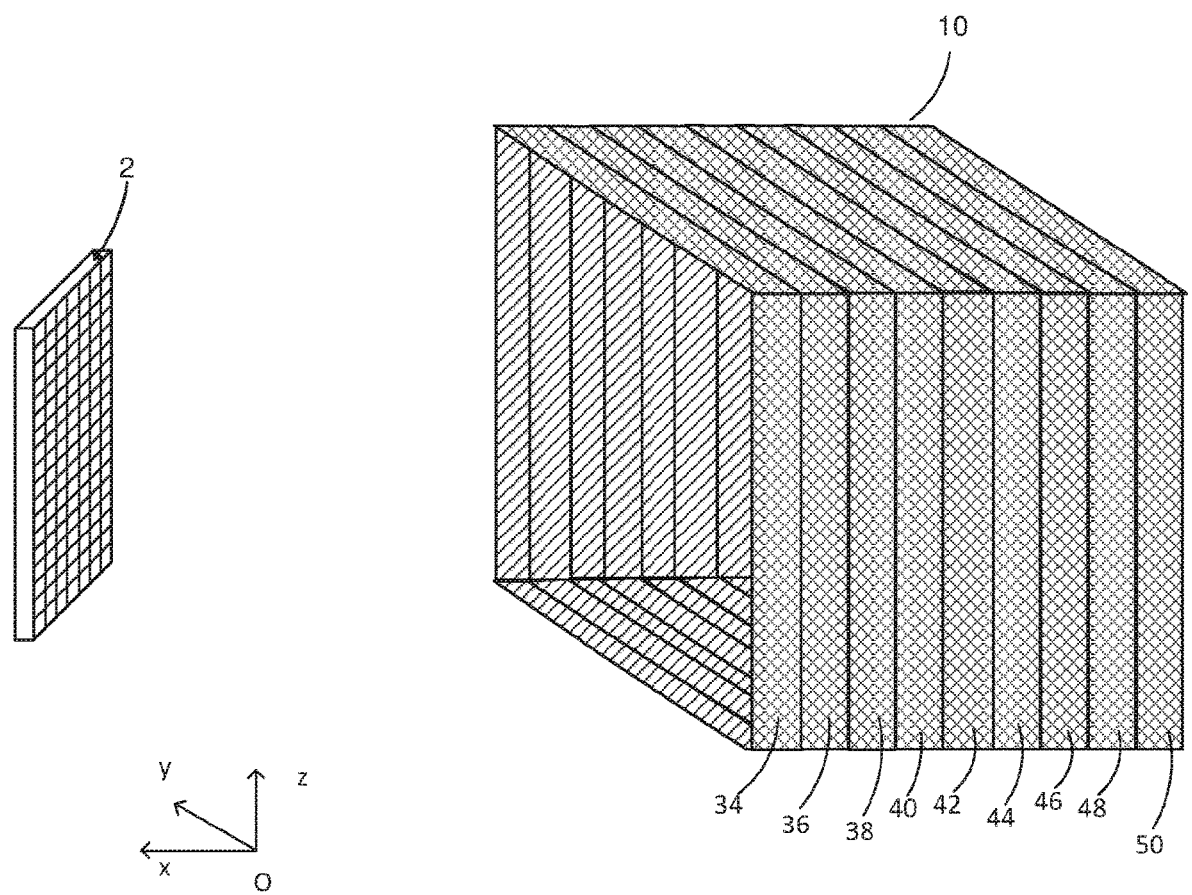
FIG. 14 shows a schematic illustration of a load that has been irradiated in zones.

FIG. 14 shows an example in which the load 10 is irradiated in successive zones 34, 36, 38, 40, 42, 44, 46, 48, 50. In the example of FIG. 14, the matrix 2 is located such that the zone 34 is closest to the matrix 2 and the zone 50 is furthest from the matrix 2. Radiation 23 scattered from the load 10 when the zone 34 is irradiated will therefore pass directly to the matrix 2 and will not pass through any other zones of the load 10, whereas radiation 23 scattered by the zone 50 will pass through the zones 34, 36, 38, 40, 42, 44, 46 and 48 before reaching the matrix 2. The scatter radiation emitted by the zone 50 will be attenuated and/or affected by the zones 34, 36, 38, 40, 42, 44, 46 and 48.

In some examples, the analyser 9 may be configured to process current data associated with the current zone and/or portion (e.g. emitting scattered radiation because currently irradiated), to take into account one of the properties of the other zones and/or portions of the load. In some examples and as explained above, the other zones may be the zones located between the current zone and the detection device 100.

Figure 15:
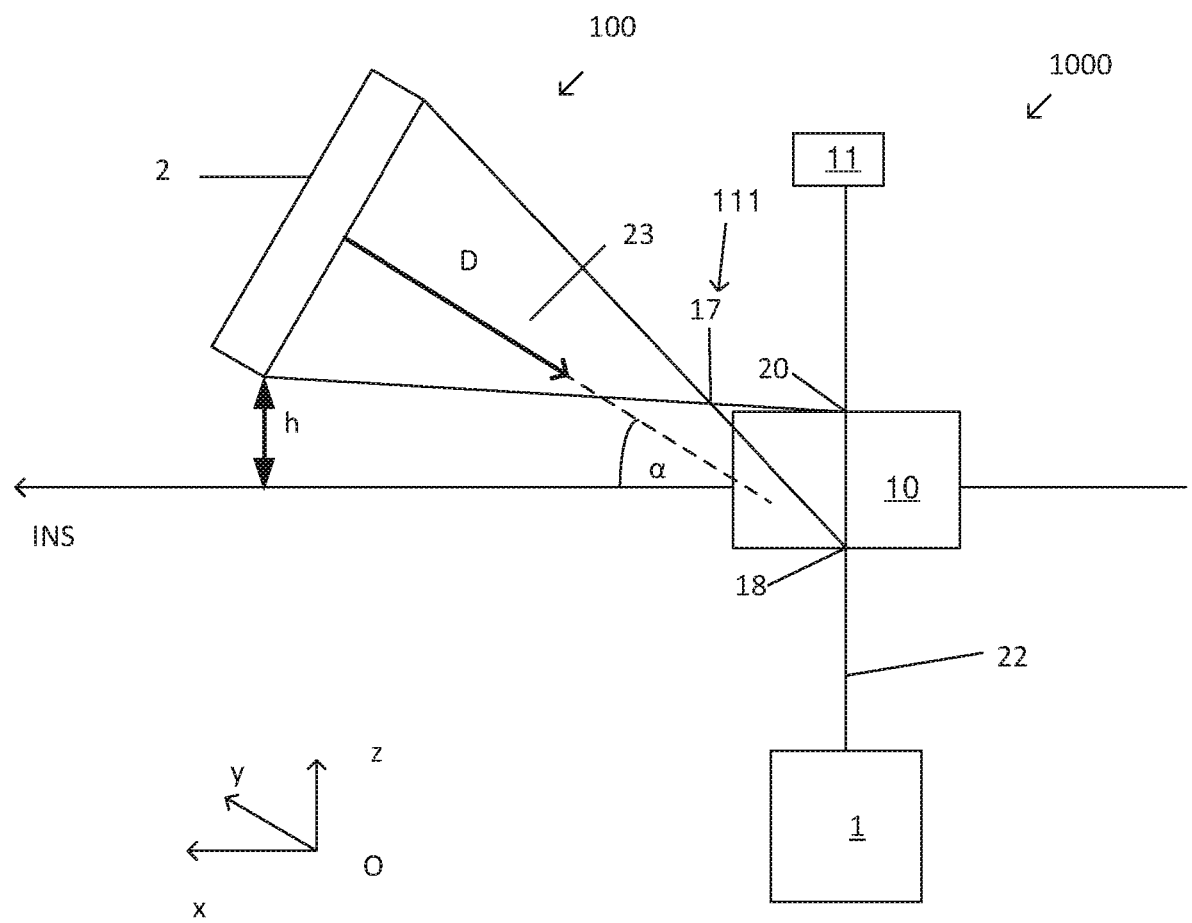
FIG. 15 shows an example system positioned at a distance from, and forming an angle with, an inspection direction of the load.

In examples where the detection system 100 needs to operate in a full pass-through and/or conveyor mode, or where relatively large loads need to be inspected, the system 100 is not located on the inspection direction INS to enable the load 10 to move along the inspection direction INS. In such examples, and as illustrated in FIG. 15, the system 100 may be positioned at a minimum distance h from the inspection direction INS and enables the load 10 to travel on the inspection direction INS without intersecting the detection system 100. The main direction of detection D of the system 100 may form an angle $\alpha$ with respect to the inspection direction INS.

In the example of FIG. 15, because of the distance h and/or the angle $\alpha$ relative to the inspection direction INS, the final image generated by data obtained by the detection system 100 may be distorted. It can be seen on FIG. 15 that the distortion is created when e.g. the radiation 23 scattered by the portion 18 is received by the matrix 2 at an angle that is different from the angle at which the radiation 23 scattered by the portion 20. The distorted final image of the slices may lead to a distorted image of the load.

In some examples, the analyser 9 may be further configured to compensate for the distortion based on the values of h and a, as the distance h and the angle $\alpha$ are known for a given detection system 100.

In the examples described above, the matrix may be square or rectangular. Alternatively or additionally, in some examples the matrix 2 may have trapezoid shape based the above values of h and α.

In some embodiments and as shown in FIG. 7, a method for inspecting one or more loads 10 comprises:
selecting, at S2, radiation scattered by each respective portion of a load to inspect, the radiation being scattered in response to the respective portion being irradiated by radiation transmitted through the portion, and
detecting, at S3, on each detector of the matrix, the radiation scattered by the associated respective portion of the load.

In some examples, the selecting performed at S2 comprises:
enabling the radiation scattered by the respective portion to reach an associated detector of a matrix of detectors, and
inhibiting any other scattered radiation from reaching the associated detector.

In some embodiments, the selecting performed at S2 may be performed by the selection device 111 of the system of any one of the aspects of the disclosure.

In some embodiments, the detecting performed at S3 may be performed by the matrix 2 of the system of any one of the aspects of the disclosure.

In some examples, the method illustrated in FIG. 7 may optionally comprise, at S1, emitting radiation for irradiation of the loads to inspect.

In some embodiments, the emitting performed at S1 may be performed by the source 1 of the apparatus and/or system of any one of the aspects of the disclosure.

In some examples, the method illustrated in FIG. 7 may optionally comprise, at S4, detecting radiation after transmission through the load.

In some embodiments, the detecting performed at S4 may be performed by the additional detector 11 of the apparatus and/or system of any one of the aspects of the disclosure.

In some embodiments, the method of FIG. 7 may further comprise generating, at S5, an image of the load, e.g. by using data associated with the matrix and/or the additional detector (when present).

In some examples, the apparatus may comprise at least a pair of detection systems, each pair comprising a detection system located on either side of an axis (e.g. the axis INS) with respect to the other detection system of the pair, with respect to the axis. The analyser may be configured to determine a position of a scattering object in the load, in a direction (e.g. Oy) perpendicular to the axis, using a ratio and/or a difference of signals associated with each detection system of the pair.

As illustrated in FIG. 16, apparatus 1000 may comprise one or more pairs of systems 100, each pair comprising:
a system 100 (e.g. 100(a) or 100(c)) located between the source 1 and the line of inspection INS; and
a system 100 (e.g. 100(b) or 100(d)) located beyond the line of inspection INS with respect to the source 1,
Let
s1 be the scattering detection signal associated with the system 100(a);
s2 be the scattering detection signal associated with the system 100(b);
s3 be the scattering detection signal associated with the system 100(c); and
s4 be the scattering detection signal associated with the system 100(d).

The ratio R or the difference D, such that:

$$R = \frac{(s1)}{(s2)} \text{ or } R = \frac{(s3)}{(s4)} \text{ or } D = s1 - s2 \text{ or } D = s3 - s4,$$

each may give an indication of the position of a scattering object in the load 10, in the (Oy) direction.

It should be understood that if the apparatus 1000 comprises a plurality of couples (such as illustrated in FIG. 16), then R or D may be such that:

$$R = \frac{(s1 + s3)}{(s2 + s4)} \text{ or } D = (s1 + s3) - (s2 + s4).$$

Alternatively or additionally, the apparatus may comprise at least one detection system comprising one or more detectors comprising two stacked layers of detection. Each layer of detection may have its own acquisition channel. The analyser may be configured to determine a nature of a scattering object in the load, using a ratio and/or a difference of signals associated with each detection layer.

As illustrated in FIG. 16, in some embodiments, one or more of the systems 100 (e.g. the system 100(d) in FIG. 16) may comprise one or more detectors comprising two stacked layers of detection, a first layer 1001 of detection and a second layer 1002 of detection. In some examples, the first layer 1001 may comprise a first scintillator and the second layer 1002 may comprise a second scintillator, each scintillator having its own acquisition channel.

Let:
s5 be the scattering detection signal associated with the first layer 1001; and
s6 be the scattering detection signal associated with the second layer 1002.

The ratio R or the difference D, such that:

$$R = \frac{(s5)}{(s6)} \text{ or } D = s5 - s6,$$

each may give an indication of the nature of the scattering object, such as radioactive material as a non-limiting example.

Alternatively or additionally, the analyser may be configured to detect the presence of radioactive gamma emitting material within the load by using the detection system between the pulses of radiation transmitted through the portion.

In some examples, any of the systems 100 illustrated in FIG. 16 may be used to detect the presence of radioactive gamma emitting materials within the load, for example between the pulses of the radiation source. This may be advantageous as the scatter detection systems may be relatively larger than transmission detection systems, and thus relatively more adapted to detect gamma rays.

Modifications and Variations

The load 10 may be any type of object and/or container, such as a holder, a vessel, or a box, etc. The load 10 may thus be, as non-limiting examples, a trailer and/or a palette (for example a palette of European standard, of US standard or of any other standard) and/or a train wagon and/or a tank and/or a boot of a vehicle such as a truck, a van and/or a car and/or a train, and/or the load 10 may be a "shipping container" (such as a tank or an ISO container or a non-ISO container or a Unit Load Device (ULD) container). It is thus appreciated that the load 10 may be any type of container, and thus may be a suitcase in some examples.

In some examples, the apparatus may comprise a filter located between the load and one or more of the systems 100. In some examples a filter may enable reduction of noise.

The system is configured to cause inspection of a cargo (not shown in the Figures) of the load through a material (usually steel) of walls of the load 10, e.g. for detection and/or identification of the cargo.

The system may be configured to cause inspection of the load, in totality (i.e. the whole load is inspected) or partially (i.e. only a chosen part of the load is inspected, e.g., typically, when inspecting a vehicle, a cabin of the vehicle may not be inspected, whereas a rear part of the vehicle is inspected).

The source 1 may comprise an accelerator, i.e. may be configured to produce and accelerate an electron beam on a metal target (such as tungsten and copper), sometimes referred to as a "focal spot", to generate the photons of the radiation 22 (by the so-called braking radiation effect, also called "Bremsstrahlung"). Alternatively or additionally, the source 1 may be configured to be activated by a power supply, such as a battery of an apparatus comprising a vehicle and/or an external power supply.

The radiation 22 may comprise y-ray radiation and/or neutron radiation. Non-limiting examples of irradiation energy from a source may be comprised between 50 keV and 15 MeV, such as 2 MeV to 6 MeV, for example. Other energies are envisaged.

In some examples the energy of the X-ray radiation may be comprised between 50 keV and 15 MeV, and the dose may be comprised between 2 mGy/min and 30 Gy/min (Gray). In some examples, the power of the source may be e.g., between 100 keV and 9.0 MeV, typically e.g. 2 MeV, 3.5 MeV, 4 MeV, or 6 MeV, for a steel penetration capacity e.g., between 40 mm to 400 mm, typically e.g., 300 mm (12 in). In some examples, the dose may be e.g., between 20 mGy/min and 120 mGy/min. In some examples, the power of the X-ray source may be e.g., between 4 MeV and 10 MeV, typically e.g., 9 MeV, for a steel penetration capacity e.g., between 300 mm to 450 mm, typically e.g., 410 mm (16.1 in). In some examples, the dose may be 17 Gy/min.

In some examples the source 1 may be configured to emit the radiation 22 with successive radiation pulses. In some examples, the source 1 may be configured to emit the radiation as a continuous emission (e.g. the source 1 may comprise an X-ray tube).

The system and/or the apparatus may be mobile and may be transported from a location to another location (the system and/or apparatus may comprise an automotive vehicle).

Alternatively or additionally, the system and/or the apparatus may be static with respect to the ground and cannot be displaced.

It should be understood that the radiation source may comprise sources of other radiation, such as, as non-limiting examples, sources of ionizing radiation, for example gamma rays or neutrons. The radiation source may also comprise sources which are not adapted to be activated by a power supply, such as radioactive sources, such as using $Co_{60}$ or $Cs_{137}$. In some examples, the inspection system may comprise other types of detectors, such as optional gamma and/or neutrons detectors, e.g., adapted to detect the presence of radioactive gamma and/or neutrons emitting materials within the load, e.g., simultaneously to the X-ray inspection.

In some examples, one or more memory elements (e.g., the memory of the analyser or a memory element of the processor) can store data used for the operations described herein. This includes the memory element being able to store software, logic, code, or processor instructions that are executed to carry out the activities described in the disclosure.

A processor can execute any type of instructions associated with the data to achieve the operations detailed herein in the disclosure. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

As one possibility, there is provided a computer program, computer program product, or computer readable medium, comprising computer program instructions to cause a programmable computer to carry out any one or more of the methods described herein. In example implementations, at least some portions of the activities related to the analyser and/or the detector may be implemented in software. It is appreciated that software components of the present disclosure may, if desired, be implemented in ROM (read only memory) form. The software components may, generally, be implemented in hardware, if desired, using conventional techniques.

Other variations and modifications of the system will be apparent to the skilled in the art in the context of the present disclosure, and various features described above may have advantages with or without other features described above. The above embodiments are to be understood as illustrative examples, and further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An apparatus comprising:
   a detection system comprising:
      a plurality of detectors, each detector being configured to detect radiation scattered by an associated respective portion of a load to inspect, the radiation being scattered in response to the respective portion being irradiated by radiation transmitted through the portion,
      a selection device configured to, for each detector of the plurality of detectors:

enable radiation scattered by the respective portion of the load to reach the associated detector of the plurality of detectors, and inhibit other scattered radiation from reaching the associated detector; and an analyser configured to process data associated with the plurality of detectors of the detection system, wherein the data comprises at least one type of data taken from the list comprising:

current data associated with a current zone of the load emitting scattered radiation, to take into account at least one property of other zones of the load, and current data associated with a current respective portion of the load emitting scattered radiation, to take into account at least one characteristic of portions of the load taken from the list comprising:

at least one property of other portions in a plane parallel to a direction of transmission of radiation; and a distance of the portion from the source of radiation.

2. The apparatus according to claim 1, comprising:
at least a pair of detection systems, each pair comprising a detection system located on either side of an axis, and wherein the analyser is configured to determine a position of a scattering object in the load, in a direction perpendicular to the axis, using at least one type of signals taken from the list comprising a ratio and a difference of signals associated with each detection system of the pair.

3. The apparatus according to claim 1, wherein dimensions of the the selection device is based on at least one dimension taken from the list comprising:
dimensions of the load to inspect; and
a distance between the load to inspect and the plurality of detectors.

4. The apparatus according to claim 1, wherein dimensions of the plurality of detectors are based on at least one dimension taken from the list comprising:
dimensions of the load to inspect; and
a distance between the load to inspect and the plurality of detectors.

5. The apparatus according to claim 2, wherein the plurality of detectors comprises a matrix of detectors.

6. The apparatus of claim 5, wherein the matrix of detectors has a ratio of dimensions based on a ratio of dimensions of the load.

7. The apparatus according to claim 1, wherein the detection system defines a main direction of detection,
the main direction of detection forming an angle with respect to a direction of inspection of the load, and
the system being positioned at a distance from the direction of inspection of the load.

8. The apparatus according to claim 7, wherein the plurality detectors of the detection system has a trapezoid shape based on:
the angle of the main direction of detection with respect to the direction of inspection of the load, and
the distance of the system to the direction of inspection of the load.

9. The apparatus according to claim 1, wherein the other zones comprise zones which have been previously irradiated.

10. The apparatus according to claim 1, wherein the analyser is further configured to process data associated with the detection system, to compensate for a difference in a distance between the detectors of the plurality of detectors to the load, caused by at least one position of the detection system taken from the list comprising:

the detection system defining a main direction of detection forming an angle with respect to a direction of inspection of the load, and
the detection system being positioned at a distance from the direction of inspection of the load.

11. The apparatus according to claim 1, wherein the analyser is further configured to estimate a nature of a material of the load, based on at least one characteristic of the scattered radiation taken from the list comprising a detection of a level of scattered radiation and a spectrum of energy of the scattered radiation.

12. The apparatus according to claim 1, wherein the analyser is further configured to compensate for blurring of the final image caused by a movement of the load during inspection.

13. A method of inspection of a load, comprising:
selecting radiation scattered by each respective portion of a load to inspect, the radiation being scattered in response to the respective portion being irradiated by radiation transmitted through the portion, the selecting comprising:
enabling the radiation scattered by the respective portion to reach an associated detector of a plurality of detectors, and
inhibiting other scattered radiation from reaching the associated detector;
detecting, on each detector of the plurality of detectors, the radiation scattered by the associated respective portion of the load; and
processing data associated with the plurality of detectors of the detection system, wherein the data comprises at least one type of data taken from the list comprising:
current data associated with a current zone of the load emitting scattered radiation, to take into account at least one property of other zones of the load, and
current data associated with a current respective portion of the load emitting scattered radiation, to take into account at least one characteristic of portions of the load taken from the list comprising:
at least one property of other portions in a plane parallel to a direction of transmission of radiation; and
a distance of the portion from the source of radiation.

14. The method of claim 13, wherein generating the image of the load comprises at least one of:
generating a 2D image and a 3D image of the load.

15. The method according to claim 13, further comprising:
determining a position of a scattering object in the load, in a direction perpendicular to an axis, using at least one of a ratio and a difference of signals associated with each detection system of at least a pair of detection systems, each pair comprising a detection system located on either side of the axis with respect to the other detection system of the pair, with respect to the axis.

16. A non-transitory computer program product comprising program instructions to program a processor to provide an apparatus comprising:
a detection system comprising:
a plurality of detectors, each detector being configured to detect radiation scattered by an associated respective portion of a load to inspect, the radiation being scattered in response to the respective portion being irradiated by radiation transmitted through the portion,
a selection device configured to, for each detector of the plurality of detectors:

enable radiation scattered by the respective portion of the load to reach the associated detector of the plurality of detectors, and inhibit other scattered radiation from reaching the associated detector; and an analyser configured to process data associated with the plurality of detectors of the detection system, wherein the data comprises at least one type of data taken from the list comprising:

current data associated with a current zone of the load emitting scattered radiation, to take into account at least one property of other zones of the load, and current data associated with a current respective portion of the load emitting scattered radiation, to take into account at least one characteristic of portions of the load taken from the list comprising:

at least one property of other portions in a plane parallel to a direction of transmission of radiation; and a distance of the portion from the source of radiation.

17. The apparatus according to claim 1, comprising:
at least one detection system comprising one or more detectors comprising two stacked layers of detection, each layer of detection having its own acquisition channel, and wherein the analyser is configured to determine a nature of a scattering object in the load, using at least one of a ratio and a difference of signals associated with each detection layer.

18. The apparatus according to claim 1, wherein the analyser is configured to detect the presence of radioactive gamma emitting material within the load by using the detection system between the pulses of radiation transmitted through the portion.

19. The method according to claim 13, comprising:
determining, by the analyser, a nature of a scattering object in the load, using at least one of a ratio and a difference of signals associated with each detection layer of at least one detection system comprising one or more detectors comprising two stacked layers of detection, each layer of detection having its own acquisition channel.

20. The method according to claim 13, comprising the analyser detecting the presence of radioactive gamma emitting material within the load by using the detection system between the pulses of radiation transmitted through the portion.

* * * * *